United States Patent
Oh et al.

(10) Patent No.: US 11,178,436 B2
(45) Date of Patent: *Nov. 16, 2021

(54) BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

(71) Applicant: LG ELECTRONICS INC., Seoul (KR)

(72) Inventors: Sejin Oh, Seoul (KR); Jongyeul Suh, Seoul (KR); Soojin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

This patent is subject to a terminal disclaimer.

(21) Appl. No.: 16/816,485

(22) Filed: Mar. 12, 2020

(65) Prior Publication Data

US 2020/0213639 A1   Jul. 2, 2020

Related U.S. Application Data

(63) Continuation of application No. 16/426,817, filed on May 30, 2019, now Pat. No. 10,638,172, which is a
(Continued)

(51) Int. Cl.
*H04N 21/2362* (2011.01)
*H04N 21/41* (2011.01)
(Continued)

(52) U.S. Cl.
CPC ..... *H04N 21/2362* (2013.01); *H04N 21/4104* (2013.01); *H04N 21/4884* (2013.01);
(Continued)

(58) Field of Classification Search
CPC .......... H04N 21/2362; H04N 21/4104; H04N 21/4884; H04N 21/84
See application file for complete search history.

(56) References Cited

U.S. PATENT DOCUMENTS 9,319,448 B2    4/2016  Chen et al.
10,171,849 B1*  1/2019  Hwang ................ H04N 21/816
(Continued)

FOREIGN PATENT DOCUMENTS

CN    103503439 A    1/2014
CN    104320212 A    1/2015
(Continued)

*Primary Examiner* — Sumaiya A Chowdhury
(74) *Attorney, Agent, or Firm* — Birch, Stewart, Kolasch & Birch, LLP

(57) ABSTRACT

A method of transmitting at least one signal over a broadcast network, a broadband network or a hybrid network in a digital transmitter, the method includes generating service layer signaling (SLS) information for at least one service, the at least one service consisting of at least one continuous video component, at least one continuous audio component and at least one closed caption component; generating a service list table (SLT) for providing bootstrap information that allows a receiver to discover the SLS information for the at least one service; and transmitting the at least one signal. Further, the bootstrap information includes a destination IP address and a destination port of a MPEG media transport protocol (MMTP) session carrying MMTP-specific SLS, a MMTP message is delivered by the MMTP session signaled in the SLT, the MMTP message includes a caption asset descriptor, and the caption asset descriptor includes profile information for representing image captions or text captions.

8 Claims, 49 Drawing Sheets

Related U.S. Application Data continuation of application No. 15/741,952, filed as application No. PCT/KR2016/007133 on Jul. 1, 2016, now Pat. No. 10,356,451.

(60) Provisional application No. 62/221,102, filed on Sep. 21, 2015, provisional application No. 62/190,747, filed on Jul. 10, 2015, provisional application No. 62/190,750, filed on Jul. 10, 2015, provisional application No. 62/189,164, filed on Jul. 6, 2015.

(51) Int. Cl.
| | |
|---|---|
| *H04N 21/488* | (2011.01) |
| *H04N 21/84* | (2011.01) |
| *H04N 21/845* | (2011.01) |
| *H04N 21/854* | (2011.01) |
| *H04N 21/235* | (2011.01) |
| *H04N 21/236* | (2011.01) |

(52) U.S. Cl.
CPC ............ *H04N 21/84* (2013.01); *H04N 21/845* (2013.01); *H04N 21/854* (2013.01); *H04N 21/235* (2013.01); *H04N 21/236* (2013.01)

(56) References Cited

U.S. PATENT DOCUMENTS

| | | |
|---|---|---|
| 2010/0002134 A1 | 1/2010 | Eyer et al. |
| 2010/0242067 A1* | 9/2010 | Song ................. H04N 21/64315 |
| | | 725/51 |
| 2011/0041065 A1 | 2/2011 | Bangma et al. |
| 2011/0149036 A1* | 6/2011 | Suh ....................... H04N 21/435 |
| | | 348/43 |
| 2012/0038782 A1 | 2/2012 | Messmer et al. |
| 2012/0331508 A1* | 12/2012 | Vare ..................... H04L 65/4076 |
| | | 725/50 |
| 2013/0169762 A1 | 7/2013 | Kanemaru et al. |
| 2014/0372624 A1 | 12/2014 | Wang et al. |
| 2015/0074129 A1 | 3/2015 | Friedrich et al. |
| 2015/0269629 A1 | 9/2015 | Lo et al. |
| 2016/0073137 A1 | 3/2016 | Dewa |
| 2016/0205449 A1 | 7/2016 | Kitazato et al. |
| 2016/0248828 A1 | 8/2016 | Kitahara et al. |

FOREIGN PATENT DOCUMENTS

| | | |
|---|---|---|
| JP | 2014-534696 A | 12/2014 |
| KR | 10-2010-0034990 A | 4/2010 |
| KR | 10-2013-0088741 A | 8/2013 |
| WO | WO 2013/133477 A1 | 9/2013 |
| WO | WO 2014/107255 A1 | 7/2014 |

\* cited by examiner

FIG. 3

| Syntax | No. of Bits | Format |
|---|---|---|
| LLS_table( ) { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|   } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | | | | | | Use | Data Type |
|---|---|---|---|---|---|---|---|
| bundleDescription | | | | | | | |
| | userServiceDescription | | | | | | |
| | | @globalServiceID | | | | 1 | anyURL |
| | | @serviceID | | | | 1 | unsignedShort |
| | | @serviceStatus | | | | 0..1 | boolean |
| | | @fullMPDUri | | | | 1 | anyURL |
| | | @sTSIDUri | | | | 1 | anyURL |
| | | name | | | | 0..N | string |
| | | | @lang | | | 1 | language |
| | | serviceLanguage | | | | 0..N | language |
| | | capabilityCode | | | | 0..1 | string |
| | | deliveryMethod | | | | 1..N | |
| | | | broadcastAppService | | | 1..N | |
| | | | | basePattern | | 1..N | string |
| | | | unicastAppService | | | 0..N | |
| | | | | basePattern | | 1..N | string |

←—t4010

| Element or Attribute Name | | | Use | Data Type |
|---|---|---|---|---|
| S-TSID | | | | |
| | @serviceID | | 1 | unsignedShort |
| | RS | | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | ScrFlow | 0..1 | scrFlowType |
| | | RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
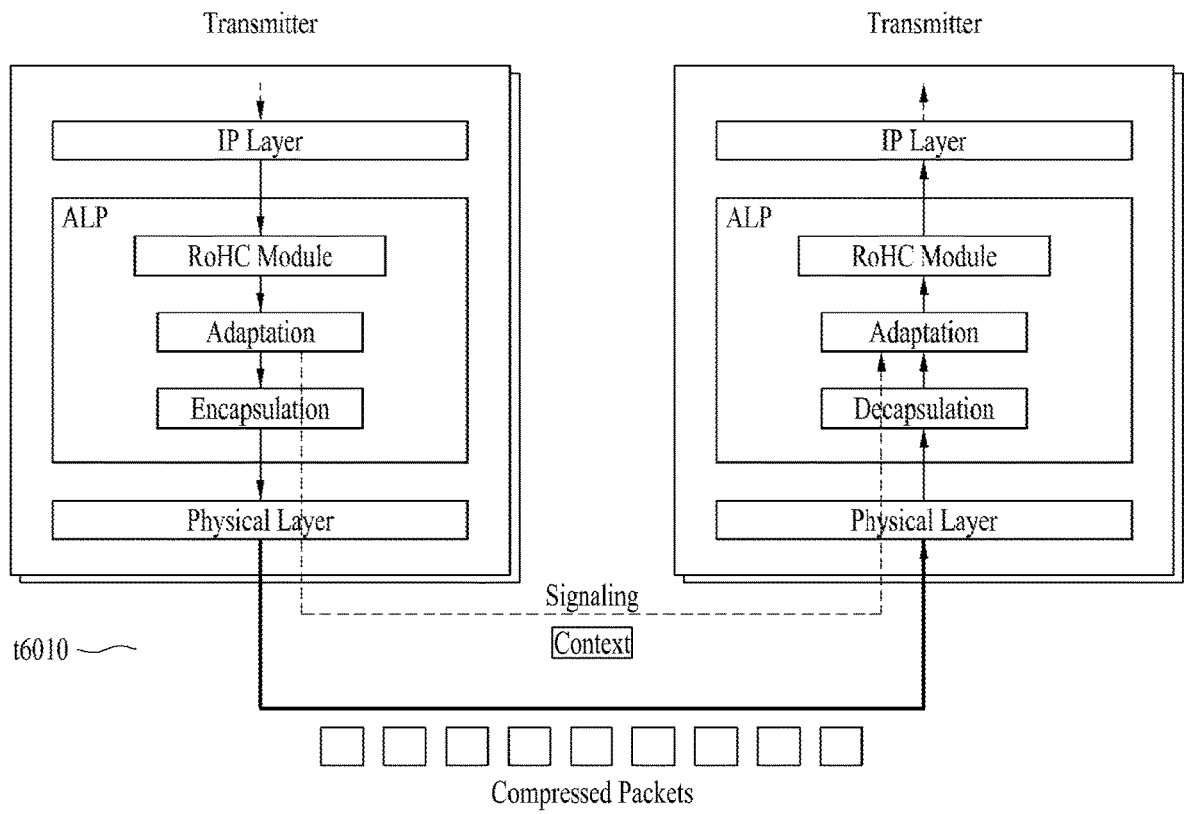
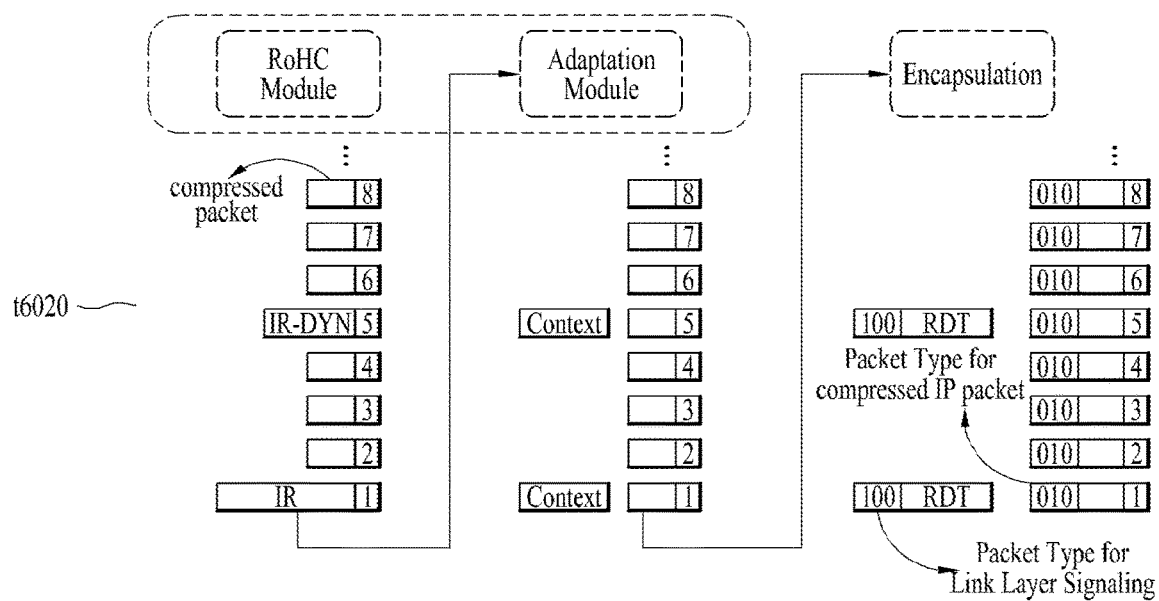

FIG. 7

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i + +) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag = = "1") { | | |
|             SID | 8 | uimsbf |
|         } | | |
|         if (compressed_flag = = '1') { | | |
|             context_id | 8 | uimsbf |
|         } | | |
|     } | | |
| } | | |

FIG. 15

```
tts:colorGamut
  : xRed yRed xGreen yGreen xBlue yBlue xWhite yWhite
  | <namedGamut>
xRed | yRed | xGreen | yGreen | xBlue | yBlue | xWhite | yWhite
  : <digit>+  // value = originalValue *10000
<namedGamut>
  : "BT709"  // 6400 3300 3000 6000 1500 600 3127 3290
  | "BT2020" // 7080 2920 1700 7970 1310 4600 3127 3290
```

FIG. 16

```
Values: <colorExt>
Initial: see prose
Applies to: span
Inherited: yes
Percentages: N/A
Animatable: discrete
```

```
Values: <colorExt>
Initial: transparent
Applies to: body, div, p, region, span
Inherited: no
Percentages: N/A
Animatable: discrete
```

```
<colorExt>
  : "#" rrrgggbbb
  | "#" rrrgggbbbaaa
  | "rgb" "(" r-value "," g-value "," b-value ")"
  | "rgba" "(" r-value "," g-value "," b-value "," a-value ")"
  | <namedColor>
rrrgggbbb
  : <hexDigit>{9}
rrrgggbbbaaa
  : <hexDigit>{12}
r-value | g-value | b-value | a-value
  : component-value
component-value
  : non-negative-integer        // valid range: [0,4096]
non-negative-integer
  : <digit>+
```

```
<region xml:id="r1">
  <style tts:extent="265px 84px"/>
  ...
  <style tts:scrollDirection="Bottom2Top"/>
  <style tts:scrollType="Line 1"/>
  ...
</region>
...
<div region="r1">
  <p begin= "00:00:00" end="00:00:08"> The snow glows white on the mountain, </p>
  <p begin= "00:00:04" end="00:00:12"> not a footprint to be seen </p>
  <p begin= "00:00:08" end="00:00:16"> A kingdom of isolation and it looks like Queen </p>
</div>
```

FIG. 18

• tts:scrollDirection – specify a property that defines the scrolling direction of content within a region
Values: <scrollDirection>
Initial: Top2Bottom
Applies to: region
Inherited: no
Percentages: N/A
Animatable: discrete

```
<scrollDirection>
  : "Top2Bottom" | "Bottom2Top" | "Left2Right" | "Right2Left"
```

• tts:scrollType– specify a property that defines the scrolling type of content within a region
Values: <scrollType>
Initial: Line 1
Applies to: region
Inherited: no
Percentages: N/A
Animatable: discrete

```
<scrollType>
  : "Line" <LineType>? LineNumber | "Pixel" PixelNumber
LineNumber | PixelNumber
    : <digit>+
LineType
  : "Normal " | "Left" | "Right" | "Flicker"
```

• tts:scrollSpeed– specify a property that defines the scrolling speed of content within a region
Values: <scrollSpeed>
Initial: 60
to: region
Inherited: no
Percentages: N/A
Animatable: discrete

```
<scrollSpeed>
  : seconds fraction?
seconds
    : [0-5][0-9] | 60
fraction
    : "." [0-9]+
```

```
<tts:Scroll
   xml:id = <xs:ID>
   direction = <scrollDirection>
   type = <scrollType>
</tts:Scroll>
```

2D Caption Text Plane is positioned in front of 3D video content

```
Values: auto | <disparity>
Initial: auto
Applies to: region
Inherited: no
```

```
<disparity>
 : scalar
 | percentage
scalar
 : sign? <digit>+
percentage
 : sign? <digit>+ "%"
sign
 : "+" | "-"
```

```
<tts:disparity
   xml:id = <xs:ID>
   disparity= <disparity>
</disparity>
```

FIG. 20

- tts:zIndexExt

The tts:zIndex attribute is used to specify a property that defines disparity (offset) value region areas .
Values: auto | <disparity>
Initial: auto
Applies to: region
Inherited: no
Percentages: N/A
Animatable: discrete

```
<region xml:id="r1">
  <style tts:origin="0px 0px"/>
  <style tts:extent="400px 100px"/>
  <style tts:padding="5px"/>
  <style tts:backgroundColor="black"/>
  <style tts:color="white"/>
  <style tts:disparity="0"/>
</region>
<region xml:id="r2">
  <style tts:origin="0px 120px"/>
  <style tts:extent="400px 100px"/>
  <style tts:padding="5px"/>
  <style tts:backgroundColor="black"/>
  <style tts:color="white"/>
  <style tts:disparity="-10%"/>
</region>
...
<p region="r1">
  I passed by his garden, and marked, with one eye,<br/>
  How the Owl and the Panther were sharing a pie.
</p>
<p region="r2">
  The Panther took pie-crust, and gravy, and meat,<br/>
  While the Owl had the dish as its share of the treat.
</p>
```

FIG. 21

```
<timeExpression>
 : clock-time
 | offset-time clock-time
 : hours ":" minutes ":" seconds ( fraction | ":" frames ( "." sub-frames )? )?
offset-time
 : time-count fraction? metric
hours
 : <digit> <digit>
 | <digit> <digit> <digit>+
minutes | seconds
 : <digit> <digit>
frames
 : <digit> <digit>
 | <digit> <digit> <digit>+
sub-frames
 : <digit>+
fraction
 : "." <digit>+
time-count
 : <digit>+
metric
 : "h"        // hours
 | "m"        // minutes
 | "s"        // seconds
 | "ms"       // milliseconds
 | "f"        // frames
 | "t"        // ticks
```

If a time expression uses a clock-time form or an offset-time form that doesn't use the ticks (t) metric, then:

M = referenceBegin + 3600 * hours + 60 * minutes + seconds + ((frames + (subFrames / subFrameRate)) / effectiveFrameRate)

where referenceBegin is determined according to whether the nearest ancestor time container employs parallel (par) or sequential (seq) semantics: if parallel or if sequential and no prior sibling timed element exists, then referenceBegin is the media time that corresponds to the beginning of the nearest ancestor time container or zero (0) if this time container is the Root Temporal Extent; otherwise, if sequential and a prior sibling timed element exists, then referenceBegin is the media time that corresponds to the active end of the immediate prior sibling timed element;

the hours, minutes, seconds, frames, subFrames components are extracted from time expression if present, or zero if not present;

subFrameRate is the computed value of the ttp:subFrameRate parameter;
effectiveFrameRate (in frames per second) is frameRate * frameRateMultipler where frameRate is the computed value of the ttp:frameRate parameter and frameRateMultiplier is the computed value of the ttp:frameRateMultiplier parameter.

Otherwise, if a time expression uses an offset-time form that uses the ticks (t) metric, then:
M = referenceBegin + ticks / tickRate
where referenceBegin is as described above;
the ticks component is extracted from time expression;
and tickRate is the computed value of the ttp:tickRate parameter;
Z

FIG. 22

```
ttp:presentationAnchorTime
: clock-time
 | offset-time clock-time
 : hours ":" minutes ":" seconds ( fraction | ":" frames ( "." sub-frames )? )?
offset-time
 : time-count fraction? metric
hours
 : <digit> <digit>
 | <digit> <digit> <digit>+
minutes | seconds
 : <digit> <digit>
frames
 : <digit> <digit>
 | <digit> <digit> <digit>+
sub-frames
 : <digit>+
fraction
 : "." <digit>+
time-count
 : <digit>+
metric
 : "h"         // hours
 | "m"         // minutes
 | "s"         // seconds
 | "ms"        // milliseconds
 | "f"         // frames
 | "t"         // ticks
```

FIG. 23

```
aligned(8) class TrackHeaderBox extends FullBox('tkhd', version, flags)
{if (version==1) {
    unsigned int(64)          unsigned int(64)
    unsigned int(64)          modification_time;
    unsigned int(32)          track_ID;
    const unsigned int(32)    reserved = 0;
    unsigned int(64)          duration;
    unsigned int(64)          composition_time_offset;
} else { // version==0
    unsigned int(32)          creation_time;
    unsigned int(32)          modification_time;
    unsigned int(32)          track_ID;
    const unsigned int(32)    reserved = 0;
    unsigned int(32)          duration;
    unsigned int(32)          composition_time_offset;
}
    const unsigned int(32)[2] reserved = 0;
    template int(16)          layer = 0;
    template int(16)          alternate_group = 0;
    template int(16)          volume = {if track_is_audio 0x0100 else 0};
    const unsigned int(16)    reserved = 0;
    template int(32)[9]       matrix=
    { 0x00010000,0,0,0,0x00010000,0,0,0,0x40000000 };// unity matrix
    unsigned int(32)          width;
    unsigned int(32)          height;
```

```
aligned(8) class TrackExtendsBox extends FullBox('trex', 0, 0){
    unsigned int(32)          track_ID;
    unsigned int(32)          default_sample_description_index;
    unsigned int(32)          default_sample_duration;
    unsigned int(32)          default_sample_size;
    unsigned int(32)          default_sample_flags;
    unsigned int(32)          composition_time_offset;
}
```

```
aligned(8) class TrackFragmentHeaderBox extends FullBox('tfhd', 0, tf_flags){
    unsigned int(32)          track_ID;
    // all the following are optional fields
    unsigned int(64)          base_data_offset;
    unsigned int(32)          sample_description_index;
    unsigned int(32)          default_sample_duration;
    unsigned int(32)          default_sample_size;
    unsigned int(32)          default_sample_flags;
    unsigned int(32)          composition_time_offset;
}
```

FIG. 24

```
aligned(8) class SegmentIndexBox extends FullBox('sidx', version, 0) {
  unsigned int(32) reference_ID;
  unsigned int(32) timescale;
  if (version==0) {
    unsigned int(32) earliest_presentation_time;
    unsigned int(32) first_offset;
    unsigned int(32) composition_time_offset;
  }
  else {
    unsigned int(64) earliest_presentation_time;
    unsigned int(64) first_offset;
    unsigned int(64) composition_time_offset;
  }
  unsigned int(16) reserved = 0;
  unsigned int(16) reference_count;
  for(i=1; i <= reference_count; i++)
  {
    bit (1)              reference_type;
    unsigned int(31)     referenced_size;
    unsigned int(32)     subsegment_duration;
    bit(1)               starts_with_SAP;
    unsigned int(3)      SAP_type;
    unsigned int(28)     SAP_delta_time;
  }
}
```

```
aligned(8) class TrackRunBox extends FullBox('trun', version, tr_flags) {
    unsigned int(32)       sample_count;
  // the following are optional fields
    signed int(32)         data_offset;
    unsigned int(32)       first_sample_flags;
    unsigned int(32)       composition_time_offset;
  // all fields in the following array are optional
  {
    unsigned int(32)       sample_duration;
    unsigned int(32)       sample_size;
    unsigned int(32)       sample_flags
    if (version == 0)
    { unsigned int(32)     sample_composition_time_offset; }
    else
    { signed int(32)       sample_composition_time_offset; }
  }[ sample_count ]
}
```

FIG. 25

• ttp:regionScaleDirection – specify a property that defines the scaling direction of a region
(it can be tts:regionScaleDirection or ttm:regionScaleDirection)
Values: <scaleDirection>
Initial: Top
Applies to: region
Inherited: no
Percentages: N/A
Animatable: discrete <scaleDirection>
 : "Top" | "Bottom" | "TopNBottom" | "Left" | "Right" | "LeftNRight" | "All"

• ttp:regionScaleLimit– specify a property that defines the scaling limit of a region
(it can be tts:regionScaleLimit or ttm:regionScaleLimit)
Values: <scale>
Initial: 1c
Applies to: region
Inherited: no
Percentages: N/A
Animatable: discrete <scale>
 : scalar
 | percentage
scalar
 : number units
percentage
 : number "%"
number
 : <digit>+
units
 : "px"
 | "em"
 | "c"

<regionScale
  xml:id = <xs:ID>
  regionScaleDirection= < scaleDirection >
  regionScaleType= <scale>
</tts:Scroll>

Note:
ttp:regionScaleLimit value can be interpreted differently according to the ttp:regionScaleDirection value. For example, when ttp:regionScaleDirection sets as "Top", closed caption region area can be extended to top side relative to height of the region.

FIG. 26

• ttp:playOutSpeed (it can be ttm:playOutSpeed, tts:playOutSpeed)
This attribute is used to specify a property that defines play-out speed for closed caption in words per minute in region areas .
Values: auto | <non-negative-number>
Initial: auto
Applies to: region
Inherited: no
Percentages: N/A
Animatable: discrete

• ttp:displayAspectRatio (ttm:displayAspectRatio or tts:displayAspectRatio)
This attribute may be used by a content author to express target aspect ratio of the display in the production of content   ttp:displayAspectRatio
: width height             // width != 0; height != 0
width | height
 : <digit>+

• ttp:alternativeAspectRatio
This attribute may be used by a content author to express alternative aspect ratio of the display in the production of content   ttp:alternativeAspectRatio
(ttm:alternativeAspectRatio or tts:alternativeAspectRatio)
 : width height             // width != 0; height != 0
width | height
 : <digit>+

FIG. 28

| Element or Attribute Name | Use | Description |
|---|---|---|
| DescriptorType | | specifies a descriptor. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |
| Legend: For attributes: M=Mandatory, O=Optional, OD=Optional with Default Value, CM=Conditionally Mandatory. For elements: <minOccurs>...<maxOccurs> (N=unbounded) Elements are bold; attributes are non-bold and preceded with an @. | | |

FIG. 29

| @schmeIdUri | description |
|---|---|
| urn:mpeg:dash:closed-caption:201x | Scheme identifier for closed caption/subtitle configuration scheme |

| @value | Use | Description |
|---|---|---|
| language | O | indicates language information of a closed caption/subtitle<br>This is represented by language code per ISO 639.2/B.<br>This may include one or more language codes. |
| accessibility | O | indicates a target user, etc. of the closed caption/subtitle and has the following value.<br>0: normal, 1:easy reader, 2:visually impaired, and 3:hearing impaired |
| aspect_ratio | O | indicates an aspect ratio intended by a closed caption/subtitle author.<br>This is represented by 4:3, 16:9, 21:9, etc. |
| alternative_aspect_ratio | O | indicates a compatible aspect ratio of the closed caption/subtitle.<br>This may be represented by 4:3, 16:9, 21:9, etc. |
| scaling_support | O | indicates whether an original closed caption/subtitle region of the closed caption/subtitle is extensible as necessary during presentation on a receiver. Alternatively, the information indicates whether a detailed parameter according to extension is included in the closed caption/subtitle or the like. When a corresponding region is extensible during presentation on a receiver, corresponding information may have '1'. |
| scrolling_support | O | indicates whether the closed caption/subtitle is capable of being scrolled on a closed caption/subtitle region or a detailed parameter based thereon is included in the closed caption/subtitle. When scrolling is possible, the corresponding information may have '1'. |
| Playout_speed | O | indicates play-output speed in an original closed caption/subtitle region when the closed caption/subtitle is presented on the receiver. |
| extended_color_use | O | indicates whether the closed caption/subtitle uses a color value configured with 8 bits or more. |
| 3D_support | O | indicates whether the closed caption/subtitle supports 3D.<br>When 3D is supported, a value of the corresponding information may be set to '1'. |
| 3D_disparity | O | indicates a 3D location of the front-most closed caption/subtitle of a caption based on a screen when the closed caption/subtitle supports 3D.<br>When the information has a negative value, the information may indicate a degree of a forward protrusion effect based on a screen and, when the information has a positive value, this may be used in an opposite way. The information may indicate a front-most value (minimum disparity) of disparity of a plurality of closed caption regions in video. |

FIG. 30

```
<?xml version="1.0" encoding="UTF-8"?>
<MPD
 xmlns="urn:mpeg:dash:schema:mpd:2011"
 type="dynamic"
 mediaPresentationDuration="PT10S"
 minBufferTime="PT1S"
 profiles="urn:mpeg:dash:profile:isoff-on-live:2011">

<ProgramInformation>
  <Title>Example of a DASH Media Presentation Description using Spatial Relationship
Description to indicate a main video and a video containing sign language</Title>
</ProgramInformation>

<Period>
  <!-- Main Video -->

...
  <!-- Subtitle -->
  <AdaptationSet segmentAlignment="true" subsegmentAlignment="true"
subsegmentStartsWithSAP="1">
    <Role schemeIdUri="urn:mpeg:dash:role:2011" value="subtitle"/>
    <SupplementalProperty schemeIdUri="mpeg:dash:closed-caption:201x"
value="ENG, 0, 4:3, , 0, 0, 1, 0, 0, 0"/>
    <Representation mimeType="video/mp4" codecs="avc1.42c033" width="1920" height="1080"
bandwidth="1055223" startWithSAP="1">
      <BaseURL>main_video.mp4</BaseURL>
      <SegmentBase indexRangeExact="true" indexRange="839-990"/>
    </Representation>
  </AdaptationSet>
</Period>
</MPD>
```

FIG. 31

| @schmeIdUri | description |
|---|---|
| urn:mpeg:dash:closed-caption-scroll:201x | Scheme identifier for closed caption/subtitle scrolling configuration scheme |

| @value | Use | Description |
|---|---|---|
| Scrolling_direction | OD default : "Bottom2Top" | indicates information on a direction in which a closed caption/subtitle region of the closed caption/subtitle is scrolled on a receiver. The information may have a value of "Top2Bottom", "Bottom2Top", "Left2Right", "Right2Left", and the like. |
| scrolling_type | OD default : "cell" | indicates a proceeding type of scrolling, etc. when the closed caption/subtitle region of the closed caption/subtitle supports scrolling on a receiver. For example, this may indicate whether scrolling is performed in units of lines (or cells) or is performed in units of pixels. |
| scrolling_amount | OD default : "1" | indicates a scrolling degree, etc. when the closed caption/subtitle information of the closed caption/subtitle supports scrolling on a receiver. This may be represented by a cell number, a pixel number, or the like. |
| scrolling_speed | O | indicates scrolling speed, etc. when an original closed caption/subtitle region of the closed caption/subtitle supports scrolling on a receiver. This may be represented in units of seconds (if necessary, this may be represented down to decimal places). |

| @schmeIdUri | description |
|---|---|
| urn:mpeg:dash:closed-caption-scale:201x | Scheme identifier for closed caption/subtitle scaling region configuration scheme |

| @value | Use | Description |
|---|---|---|
| scale_direction | O | indicates information on a direction in which a closed caption/subtitle region of a closed caption/subtitle is extensible. The information may have a value of "Top", "Bottom", "TomNBottom", "Left", "Right", "LeftNRight", "All", or the like. |
| scale_limit | O | indicates an extension limit degree or the like when the closed caption/subtitle region of the closed caption/subtitle is extensible. This may be represented by a cell number, a pixel number, or the like or may be represented by a percentage degree or the like. |

FIG. 32

| @schmeIdUri | description |
|---|---|
| urn:mpeg:dash:anchor_presentation:201x | Scheme identifier for anchor of presentation time of media essence (including closed caption/subtitle) |

| @value | Use | Description |
|---|---|---|
| Time_format | O | indicates format information of presentation anchor time. This may have a value of UTC, clock, offset, PTP, etc. |
| Time_value | O | includes a presentation anchor time value. This may be represented in different forms according to the time_format.<br>- when the time_format is clock<br>hour: minute: second (seconds or frames of decimal places).<br>hours ":" minutes ":" seconds (fraction \| ":" frames (":" sub-frames)?)? |

| @schmeIdUri | description |
|---|---|
| urn:mpeg:dash:presentation_offset:201x | Scheme identifier for presentation offset of media essence (including closed caption/subtitle) |

| @value | Use | Description |
|---|---|---|
| Time_format | O | indicates format information of presentation timing offset. This may have a value of clock, offset, etc. |
| Time_value | O | includes presentation timing offset value. This may be represented in different forms according to the time_format.<br>- when the time_format is clock<br>hour: minute: second (seconds or frames of decimal places).<br>hours ":" minutes ":" seconds (fraction \| ":" frames (":" sub-frames)?)?<br>- when the time_format is offset<br>- tick_rate: tick number based on tick_rate |

FIG. 35

| Element or Attribute Name | Use | Description |
|---|---|---|
| bundleDescription | | Root element of the User Service Bundle Description. |
|   userServiceDescription | | A single instance of an Service. |
|     @serviceId | M | Globally unique identifier of the Service. |
|     @atsc:serviceId | M | Reference to corresponding service entry in LLS. The value of this attribute is the same value of serviceId assigned to the entry. |
|     @atsc:providerid | O | Identifier for the provider which is broadcasting this service. |
|     @atsc:serviceCategory | O | Attribute indicates the category of this service |
|     @atsc:spIndicator | O | When set to true, that one or more components necessary for meaningful presentation is protected. When set to false, this flag indicates that no components necessary for meaningful presentation of the service are protected. |
|     @atsc:serviceStatus | O | Attribute indicates the status of this service, a pair of these values, ['0': Inactive or '1':Active] and ['2':Shown or '3':Hidden]. |
|     @atsc:shortServiceName | O | Short string name of the Service |
|     name | 0..N | Service name |
|       @lang | CM | Language of the service name. |
|     serviceLanguage | 0..N | Available languages of the service. |
|     atsc:capabilityCode | 0..1 | the capabilities and capability groups required in the receiver to be able to create a meaningful presentation of the content of this service. |
|     atsc:serviceType | 0..1 | specifying the type of the service when the components are combined. E.g. 3D service, multiview service, panorama, and so on. |
|     atsc:channel | 1 | information about the channel in the service |
|       @atsc:majorChannelNo | 1 | Attribute indicates the major channel number of the service. |
|       @atsc:minorChannelNo | 1 | Attribute indicates the minor channel number of the service. |
|       @atsc:serviceLang | 1 | Attribute indicates the primary language used in the service. |
|       @atsc:serviceGenre | 0..1 | Attribute indicates primary genre of the service. |
|       @atsc:serviceIcon | 0..1 | Attribute indicates the Uniform Resource Locator (URL) for the icon used to represent this service. |
|     atsc:serviceDescription | 0..N | service description possibly in multiple languages. |
|       @atsc:serviceDescrText | 1 | Attribute indicates description of the service. |
|       @atsc:serviceDescrLang | 0..1 | Attribute indicates the language of the serviceDescrText |
|     atsc:dashComponent | 0..1 | A description about the content components of Service delivered as MPEG DASH |
|       @atsc:fullMPDUri | M | Reference to an MPD fragment which contains descriptions for contents components of the Service delivered over broadcast or broadband. |
|       @atsc:sTSIDUri | M | Reference to the S-TSID fragment which provides access related parameters to the Transport sessions carrying contents of this Service. |
|       deliveryMethod | 1..N | Container of transport related information pertaining to the contents of the service over broadcast and broadband modes of access. |
|         atsc:broadcastAppService | 1..N | A DASH Representation delivered over broadcast, in multiplexed or non-multiplexed form, containing the corresponding media component(s) belonging to the Service, across all Periods of the affiliated Media Presentation. |
|           basePattern | 1..N | A character pattern for use by the receiver to match against any portion of the Segment URL used by the DASH client to request Media Segments of a parent Representation under its containing Period . |
|         atsc:unicastAppService | 0..N | A DASH Representation delivered over broadband, in multiplexed or non-multiplexed form, containing the constituent media content component(s) belonging to the Service, across all Periods of the affiliated Media Presentation. |
|           basePattern | 1..N | A character pattern for use by the the receiver to match against any portion of the Segment URL used by the DASH client to request Media Segments of a parent Representation under its containing Period . |
|     atsc:mpuComponent | 0..1 | A description about the contents components of service delivered as MPUs |
|       @atsc:MMT_Package_ID | M | Reference to a MMT Package for content components of the ATSC 3.0 Service delivered as MPUs. |
|       atsc:next_MMT_Package_ID | O | Reference to a MMT Package to be used after the one referenced by @atsc: MMT_Package_ID in time for content components of the ATSC 3.0 Service delivered as MPUs. |

FIG. 36

| | | | |
|---|---|---|---|
| ComponentInfo | | 1..N | Contains information about components available in the service. |
| | @componentType | 1 | Attribute indicates the type of this component. Value of 0 indicates an audio component. Value of 1 indicates a video component. Value of 2 indicated a closed caption component. Value of 3 indicates an application component. Values 4 to 7 are reserved. |
| | @componentRole | 0..1 | Attribute indicates the role or kind of this component. For audio (when componentType attribute above is equal to 0): values of componentRole attribute can be as follows: 0 = Complete main, 1 = Music , 2=Effects, 3= Dialog, 4 = Commentary, 5 = Visually Impaired, 6 = Hearing Impaired, 6 = Voice-Over(audio description describing video component), 7= subset, 8-254= reserved, 255 = unknown. For Video (when componentType attribute above is equal to 1) values of componentRole attribute are as follows: 0 = Primary video, 1= Alternative camera view, 2 = Other alternative video component, 3 = Sign language, 4 = Follow subject video, 5 = 3D video left view, 6 = 3D video right view, 7 = 3D video depth information, 8 = Part of video array <x,y> of <n,m>, 9 = Follow-Subject metadata, 10 = enhanced Video, 11: closed caption included. 12-254 = reserved, 255 = unknown. For Closed Caption component (when componentType attribute above is equal to 2) values of componentRole attribute are as follows: 0 = main, 1=alternate, 2= supplementary 3 = Normal, 4 = Easy reader, 5: textual description (a textual description describing video component), 6-254 = reserved, 255 = unknown. |
| | @componentProtectedFlag | 0..1 | Attribute indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. |
| | @componentId | 1 | Attribute indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. |
| | @componentName | 0..1 | Attribute indicates the human readable name of this component. |
| | @componentGroupId | 0..1 | Identifier for a component group that consists of a collection of components, and which represent the same scene, and which are to be combined in some combination to produce a presentation (e.g., music, dialog and effects audio components that are to be mixed to give complete audio, or left and right 3D views that are to be combined to give 3D pictures). |
| | @essentialIndicator | 0..1 | Attribute indicates whether this component is an essential component for the Service when set to '1'. Otherwise, this indicates that this component is an optional component. |
| | @dependentComponentID | 0..N | Attribute indicates an identifier(s) of dependent component(s). For example, an enhanced video component can have an identifier for associated base video component(s) |
| | @protocolType | 0..1 | Attribute indicates application layer transport protocol carrying this component (e.g., ROUTE, MMTP) |
| | @rt | 0..1 | Attribute indicates whether this component is carried in real-time or not. |
| | @targetDevice | 0..1 | Attribute indicates a target device. It can have following values. 0= primary device, 1= companion device, 2= both primary and companion devices, 3=inset on primary screen. |
| | @componentCodec | 0..1 | Codec information f this component. The codec parameters also can include profile and level information where applicable |
| | @componentProfile | 0..1 | Profile of this component |
| | @componentLang | 0..1 | Language used in this component (e.g., audio, closed caption component) |
| | @width | 0..1 | The horizontal visual presentation size of the video media type |
| | @height | 0..1 | The vertical visual presentation size of the video media type |
| | Accessibility | 0..N | The information about the accessibility of this component |
| | Capability | 0..N | The information about the capability of this component |
| | Rating | 0..N | Content advisory rating information related to this component |
| | Targeting | 0..N | Targeting or personalization properties related to this component |
| | ComponentDescription | 0..N | Component description. It can include codec dependent encoding parameters |
| | ComponentProperty | 0..N | Component properties for processing this component |

Legend: For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 37

| ComponentDescription@schmeIdUri | description |
|---|---|
| urn:atsc3.0:caption:201x | Scheme identifier for closed caption component description |

| ComponentDescription@value | Use | Description |
|---|---|---|
| caption_codec | M | indicates an encoding type of a corresponding caption component. In some embodiments, the field may indicate "CEA-608", "CEA-708", "SMPTE-TT", or the like. |
| lang | O | includes language information of a corresponding caption component. |
| caption_service_number | O | includes a service number of a corresponding caption when a type of a corresponding caption component is CEA-708. |
| easy_reader_flag | O | a flag indicating whether a corresponding caption component is an easy reader. |
| aspect_ratio | O | indicates a display aspect ratio of a corresponding caption component. In some embodiments, the field may indicate "4:3", "16:9", or the like. |
| 3D supported | OD Default:false | indicates whether a corresponding caption component supports 3D |

```
USBD/USD
  @atsc:serviceId=0x0010
  ...
  @atsc:capabilityCode
  ComponentInfo
    @componentType =0x03(closed caption)
    @componentRole = (main)
    ..
    @componentId = 0x01
    ComponentDescription
      ...
}
```

```
<ComponentDescription
schemeIdUri="urn:atsc3.0:caption:201x"
value="SMPTE-TT, ENG, , false, 4:3,false"/>
```

FIG. 38

| @schmeIdUri | description |
|---|---|
| urn:atsc3.0:caption:201x | Scheme identifier for closed caption component description |

| @value | Use | Description |
|---|---|---|
| caption_codec | M | indicates an encoding type of a corresponding caption component. In some embodiments, the field may indicate "CEA-608", "CEA-708", "SMPTE-TT", or the like. |
| lang | O | includes language information of a corresponding caption component |
| caption_service_number | O | includes a service number of a corresponding caption when a type of a corresponding caption component is CEA-708 |
| accessibility | O | indicates a target user, etc. of a closed caption/subtitle included in a corresponding caption component and information thereof may have the following values. The information may indicate 0: normal, 1: easy reader, 2: visually impaired, and 3: hearing impaired. |
| aspect_ratio | O | indicates a display aspect ratio of a corresponding caption component. This may indicate "4:3", "16:9", "21:9", and the like. |
| alternative_aspect_ratio | O | indicates a compatible display aspect ratio of a corresponding caption component. This may indicate "4:3", "16:9", "21:9", and the like. |
| scaling_support | O | indicates whether an original closed caption/subtitle region of the closed caption/subtitle is extensible as necessary during presentation on a receiver. Alternatively, the field may indicate whether the closed caption/subtitle, etc. include a detailed parameter according to extension. When a corresponding region is extensible during presentation on a receiver, the field may have '1'. |
| scrolling_support | O | indicates whether scrolling of an original closed caption/subtitle region of the closed caption/subtitle is supported on a receiver. Alternatively, the field may indicate whether a detailed parameter according to thereto is included in a closed caption/subtitle. When scrolling is enabled, corresponding information may have '1'. |
| playout_speed | O | indicates play-out speed of an original closed caption/subtitle region of the closed caption/subtitle during presentation on a receiver. |
| extended_color_use | O | indicates whether the closed caption/subtitle uses a color value configured with 8 bits or more. |
| 3D_support | O | indicates whether a corresponding caption component supports 3D. When 3D is supported, the value may have a value of '1'. |
| 3D_disparity | O | indicates a 3D location of the front-most closed caption/subtitle of a caption based on a screen when the closed caption/subtitle supports 3D. When the 3D_disparity has a negative value, the information may indicate a degree of a forward protrusion effect based on a screen and, when the 3D_disparity has a positive value, this may be used in an opposite way. The information may explicitly indicate a front-most value (minimum disparity) of disparity of a plurality of closed caption regions in video. |

FIG. 39

| @schmeIdUri | | description |
|---|---|---|
| urn:atsc3.0:caption:201x | | Scheme identifier for closed caption component description |

| @value | Use | Description |
|---|---|---|
| caption_codec | M | indicates an encoding type of a corresponding caption component and indicates "CEA-608", "CEA-708", "SMPTE-TT", or the like. |
| lang | O | includes language information of a corresponding caption component. |
| caption_service_number | O | includes a service number of a corresponding caption when a type of a corresponding caption component is CEA-708. |
| profile | O | indicates a form indicating a closed caption using an XML-based Timed text or the like (e.g., TTML, IMSC, and EBU-TT-D) |
| profile_version | | indicates version information of a form indicated by the aforementioned profile. That is, when the profile indicates TTML, the field may indicate TTML1 or TTML2 and when the profile uses IMSC, the field may indicate IMSC1, IMSC2, or the like. |
| sub-profile | O | indicates a detailed profile in a form indicated by the aforementioned profile. For example, in the case of IMSC, the field may indicate an image-only profile, a text-only profile, or the like. That is, the field may indicate whether a caption/subtitle includes only an image and includes only a text, and, furthermore, whether an image and a text are mixed. |
| accessibility | O | indicates a target user, etc. of the closed caption/subtitle or the like and information thereof indicates 0: normal, 1:easy reader, 2:visually impaired, and 3:hearing impaired. |
| aspect_ratio | O | indicates an aspect ratio intended by a closed caption/subtitle author. For example, this may be represented by 4:3, 16:9, 21:9, or the like. |
| alternative_aspect_ratio | O | indicates a compatible aspect ratio of the closed caption/subtitle. This may be represented by 4:3, 16:9, 21:9, or the like. |
| scaling_support | O | indicates whether an original closed caption/subtitle region of the closed caption/subtitle is extensible as necessary during presentation on a receiver or indicates whether a detailed parameter according to extension is included in the closed caption/subtitle or the like. When a corresponding region is extensible during presentation on a receiver, corresponding information may have '1'. |
| scrolling_support | O | indicates whether the closed caption/subtitle is capable of being scrolled on a closed caption/subtitle region or a detailed parameter based thereon is included in the closed caption/subtitle. When scrolling is possible, the corresponding information may have '1'. |
| playout_speed | O | indicates play-output speed in an original closed caption/subtitle region when the closed caption/subtitle is presented on the receiver. |
| extended_color_use | O | indicates whether the closed caption/subtitle uses a color value configured with 8 bits or more. |
| 3D_support | O | indicates whether the closed caption/subtitle supports 3D. When 3D is supported, a value of the corresponding information may be set to '1'. |
| 3D_disparity | O | indicates a 3D location of the front-most closed caption/subtitle of a caption based on a screen when the closed caption/subtitle supports 3D. When the information has a negative value, the information may indicate a degree of a forward protrusion effect based on a screen and, when the information has a positive value, this may be used in an opposite way. The information may indicate a front-most value (minimum disparity) of disparity of a plurality of closed caption regions in video. |
| WCG_support | O | indicates whether a closed caption/subtitle uses wide color gamut |
| Color_gamut | O | indicates information on color gamut used by the closed caption/subtitle. The field may include a color gamut type (BT 709, BT2020, etc.) and, furthermore, may include a CIExy coordinate value of red, green, blue, and white points. |
| HDR_support | O | indicates whether a closed caption/subtitle includes HDR content. |
| HDR | O | includes an identifier indicating a combination of HDR related parameters used by the closed caption/subtitle. In some embodiments, the HDR may have the following values.<br>* 0 : non-specified<br>* 1: EOTF: SMPTE ST2084, bit depth: 12bit/pixel, peak luminance: 10000nit, codec: HEVC dual codec (HEVC+HEVC), and metadata uses SMPTE ST 2086 and SMPTE ST 2094.<br>* 2: EOTF: SMPTE ST2084, bit depth: 10bit/pixel, peak luminance: 4000nit, codec: HEVC single codec, and metadata uses SMPTE ST 2086 and SMPTE ST 2094.<br>*3 : EOTF : BBC EOTF, bit depth: 10bit/pixel, peak luminance : 1000nit, codec : HEVC single codec<br>* 4-255: reserved for future use. The HDR may include values indicating OETF_type, max_mastering_display_luminance, min_mastering_display_luminance, average_frame_luminance_level, max_frame_pixel_luminance, and the like. |

FIG. 40

| Syntax | No. of Bits | Format |
|---|---|---|
| mmt_atsc3_message() { | | |
|   message_id | 16 | uimsbf |
|   version | 8 | uimsbf |
|   length | 32 | uimsbf |
|   message payload { | | |
|     service_id | 16 | uimsbf |
|     atsc3_message_content_type | 8 | uimsbf |
|     atsc3_message_content_version | 8 | uimsbf |
|     atsc3_message_content_compression | 8 | uimsbf |
|     URI_length | 8 | uimsbf |
|     for (i=0;i< URI_length;i++) { | | |
|       URI_byte | 8 | uimsbf |
|     } | | |
|     atsc3_message_content_length | 32 | uimsbf |
|     for (i=0;i<atsc3_message_content_length;i++) { | | |
|       atsc3_message_content_byte | 8 | uimsbf |
|     } | | |
|     for (i=0;i<length-10-URI_length-atsc3_message_content_length) { | | |
|       reserved | 8 | uimsbf |
|     } | | |
|   } | | |
| } | | |

FIG. 41

| Syntax | No. of bits | format |
|---|---|---|
| DCI_table() { | | |
|     table_id | 8 | uimsbf |
|     version | 8 | uimsbf |
|     length | 16 | uimsbf |
|     number_of_assets | 8 | uimsbf |
|     for (i=0; i<N1; i++) { | | |
|         asset_id() | | |
|         mime_type() | | |
|         reserved | 7 | '1111111' |
|         codec_complexity_flag | 1 | bslbf |
|         if (codec_complexity_flag == 1) { | | |
|             if (top_level_mime_type == VIDEO) { | | |
|                 video_codec_complexity { | | |
|                       video_average_bitrate | 16 | uimsbf |
|                       video_maximum_bitrate | 16 | uimsbf |
|                       horizontal_resolution | 16 | uimsbf |
|                       vertical_resolution | 16 | uimsbf |
|                       temporal_resolution | 8 | uimsbf |
|                       video_minimum_buffer_size | 16 | uimsbf |
|                 } | | |
|             } else if (top_level_mime_type == AUDIO) { | | |
|                 audio_codec_complexity { | 16 | uimsbf |
|                       audio_average_bitrate | 16 | uimsbf |
|                       audio_maximum_bitrate | 16 | uimsbf |
|                       audio_minimum_buffer_size | | |
|                 } | | |
|             } | | |
|         } | | |
|         else { | | |
|             download_capability { | | |
|                 required_storage | 32 | uimsbf |
|             } | | |
|         } | | |
|         asset_descriptors { | | |
|             num_asset_descriptors | 8 | uimsbf |
|             for (j=0; j<num_asset_descriptor ; j++) { | | |
|                 asset_descriptors_byte | var | |
|             } | | |
|         } | | |
|     } | | |
| } | | |

FIG. 42

| Syntax | No. of bits | format |
|---|---|---|
| MP_table() { | | |
|     table_id | 8 | uimsbf |
|     version | 8 | uimsbf |
|     length | 16 | uimsbf |
|     reserved | 6 | bslbf |
|     MP_table_mode | 2 | bslbf |
|     If (table_id == SUBSET_0_MPT_TABLE_ID) { | | |
|         MMT_package_id | | |
|             MMT_package_id_length | 8 | uimsbf |
|             for (i=0; i<N1; i++) { | | |
|                 MMT_package_id_byte | 8 | uimsbf |
|             } | | |
|         ... | | |
|     } | | |
|     service_type | 8 | uimsbf |
|     number_of_assets /*N3*/ | 8 | uimsbf |
|     for (i=0; i<N3; i++) { | | |
|         Identifier_mapping() | | |
|         asset_type | 32 | char |
|         mime_type_len /*ML*/ | 8 | uimsbf |
|         mime_type() | ML *8 | char |
|         packet_id | 16 | uimsbf |
|         reserved | 3 | '111' |
|         asset_role_flag | 1 | bslbf |
|         asset_target_flag | 1 | bslbf |
|         asset_group_flag | 1 | bslbf |
|         rt_flag | 1 | bslbf |
|         default_asset_flag | 1 | bslbf |
|         asset_clock_relation_flag | 1 | bslbf |
|         if (asset_clock_relation_flag == 1) { | | |
|             asset_clock_relation_id | 8 | uimsbf |
|             reserved | 7 | bslbf |
|             asset_timescale_flag | 1 | bslbf |
|             if (asset_time_scale_flag == 1) { | | |
|                 asset_timescale | 32 | uimsbf |
|             } | | |
|         } | | |
|         if (asset_role_flag == 1) { | | |
|             asset_role | 8 | uimsbf |
|         } | | |
|         if (asset_target_flag == 1) { | | |
|             asset_target | 8 | uimsbf |
|         } | | |
|         if (asset_group_flag == 1) { | | |
|             asset_group_id | 8 | uimsbf |
|         } | | |
|         asset_location | | |
|             location_count | 16 | uimsbf |
|             for (i=0; i<N6; i++) { | | |
|                 MMT_general_location_info() | 8 | uimsbf |
|             } | | |
|         } | | |
|         asset_descriptors { | | |
|             asset_descriptors_length | 16 | |
|             for (j=0; j<N5; j++) { | | |
|                 asset_descriptors_byte | | |
|             } | | |
|         } | | |
|     } | | |

FIG. 43

| Syntax | No. of bits | format |
|---|---|---|
| accessibility_descriptor () { | | |
|     descriptor_tag | 8 | uimsbf |
|     descriptor_length | 8 | uimsbf |
|     num_of_accessiblity | 8 | uimsbf |
|     for(int i=0;i<num_of_accessibility;i++) | | |
|     { | | |
|         accessiblity_code | 8 | uimsbf |
|     } | | |
| } | | |

| Syntax | No. of bits | format |
|---|---|---|
| capability_descriptor() { | | |
|     descriptor_tag | 8 | uimsbf |
|     descriptor_length | 8 | uimsbf |
|     num_capability_codes | 8 | uimsbf |
|     for(int i=0; i< num_capability_codes; i++) | | |
|         essential_indicator | 1 | bslbf |
|         capability_category | 7 | uimsbf |
|         capability_code | 8 | uimsbf |
|     } | | |
| } | | |

| Syntax | No. of bits | format |
|---|---|---|
| asset_group_descriptor () { | | |
|     descriptor_tag | 8 | uimsbf |
|     descriptor_length | 8 | uimsbf |
|     asset_group_id | 8 | uimsbf |
|     num_of_asset | 8 | uimsbf |
|     for(int i=0;i<num_of_asset;i++) | | |
|     { | | |
|         asset_id() | | uimsbf |
|     } | | |
| } | | |

FIG. 44

| Syntax | No. of bits | format |
|---|---|---|
| closed_caption_descriptor() { | | |
|     descriptor_tag | 8 | uimsbf |
|     descriptor_length | 8 | uimsbf |
|     caption_lang | 8*3 | uimsbf |
|     caption_codec | 4 | uimsbf |
|     easy_reader | 1 | bslbf |
|     wide_aspect_ratio | 2 | uimsbf |
|     url_flag | 1 | bslbf |
|     reserved | 7 | '1111111' |
|     3d_supported | 1 | bslbf |
|     If(caption_codec == 0x02 ){ | | |
|         caption_service_number/*m*/ | | |
|     } | | |
|     if(url_flag ){ | | |
|         URL_length | 8 | uimsbf |
|         URL_text() | var | |
|     } | | |
| } | | |

FIG. 45

| Syntax | No. of bits | format |
|---|---|---|
| closed_caption_descriptor() { | | |
|     descriptor_tag | 8 | uimsbf |
|     descriptor_length | 8 | uimsbf |
|     caption_lang | 8*3 | uimsbf |
|     caption_codec | 4 | uimsbf |
|     target_accessbility | 4 | uimsbf |
|     aspect_ratio | 4 | uimsbf |
|     alternative_aspect_ratio_flag | 1 | bslbf |
|     url_flag | 1 | bslbf |
|     3d_supported | 1 | bslbf |
|     scrolling_supported | 1 | bslbf |
|     scaling_supported | 1 | bslbf |
|     playout_speed_flag | 1 | bslbf |
|     extended_color_use | 1 | bslbf |
|     reserved | 1 | '1' |
|     If(caption_codec == 0x02 ){ | | |
|     caption_service_number/*m*/ | 3 | uimsbf |
|     } | | |
|     if(alternative_aspect_ratio_flag){ | | |
|         alternative_aspect_ratio | 8 | uimsbf |
|     } | | |
|     if(url_flag ){ | | |
|         URL_length | 8 | uimsbf |
|         URL_text() | var | |
|     } | | |
|     if(3d_supported){ | | |
|         min_disparity | 16 | uimsbf |
|     } | | |
|     if(scrolling_supported){ | | |
|         scroll_direction | 4 | uimsbf |
|         scroll_type | 4 | uimsbf |
|         Scroll_amount | 16 | uimsbf |
|         scroll_speed | 32 | uimsbf |
|     } | | |
|     if(scaling_supported){ | | |
|         scale_direction | 4 | uimsbf |
|         scale_limit_format | 4 | uimsbf |
|         scale_limit_value | 16 | uimsbf |
|     } | | |
|     if(playout_speed_flag){ | | |
|         playout_speed | 32 | uimsbf |
|     } | | |
| } | | |

FIG. 46

| Syntax | No. of bits | format |
|---|---|---|
| closed_caption_descriptor() { | | |
|     descriptor_tag | 8 | uimsbf |
|     descriptor_length | 8 | uimsbf |
|     caption_lang | 8*3 | uimsbf |
|     caption_codec | 4 | uimsbf |
|     profile | 4 | uimsbf |
|     profile_version | 4 | uimsbf |
|     sub_profile | 4 | uimsbf |
|     target_accessbility | 4 | uimsbf |
|     aspect_ratio | 4 | uimsbf |
|     alternative_aspect_ratio_flag | 1 | bslbf |
|     url_flag | 1 | bslbf |
|     3d_supported | 1 | bslbf |
|     scrolling_supported | 1 | bslbf |
|     scaling_supported | 1 | bslbf |
|     playout_speed_flag | 1 | bslbf |
|     extended_color_use | 1 | bslbf |
|     wcg_use | 1 | bslbf |
|     color_gamut_included | 1 | bslbf |
|     hdr_use | 1 | bslbf |
|     reserved | 6 | '1111111' |
|     If(caption_codec == 0x02 ){ | | |
|         caption_service_number/*m*/ | 3 | uimsbf |
|     } | | |
|     if(alternative_aspect_ratio_flag){ | | |
|         alternative_aspect_ratio | 8 | uimsbf |
|     } | | |
|     if(url_flag){ | | |
|         URL_length | 8 | uimsbf |
|         URL_text() | var | |
|     } | | |
|     if(3d_supported){ | | |
|         min_disparity | 16 | uimsbf |
|     } | | |
|     if(scrolling_supported){ | | |
|         scroll_direction | 4 | uimsbf |
|         scroll_type | 4 | uimsbf |
|         Scroll_amount | 16 | uimsbf |
|         scroll_speed | 32 | uimsbf |
|     } | | |
|     if(scaling_supported){ | | |
|         scale_direction | 4 | uimsbf |
|         scale_limit_format | 4 | uimsbf |
|         scale_limit_value | 16 | uimsbf |
|     } | | |
|     if(playout_speed_flag){ | | |
|         playout_speed | 32 | uimsbf |
|     } | | |

FIG. 47

| Syntax | No. of bits | format |
|---|---|---|
| if(color_gamut_included ==1){ | | |
|     color_gamut_type | 8 | uimsbf |
|     reserved | 7 | '1111111' |
|     color_primary_flag | 1 | bslbf |
|     if(color_primary_flag ==1){ | | |
|         color_primaryRx | 32 | uimsbf |
|         color_primaryRy | 32 | uimsbf |
|         color_primaryGx | 32 | uimsbf |
|         color_primaryGy | 32 | uimsbf |
|         color_primaryBx | 32 | uimsbf |
|         color_primaryBy | 32 | uimsbf |
|         color_primaryWhitePx | 32 | uimsbf |
|         color_primaryWhitePy | 32 | uimsbf |
|     } | | |
| } | | |
| if(hdr_use ==1){ | | |
|     hdr_param_set | 8 | uimsbf |
|     reserved | 7 | '1111111' |
|     hdr_config_flag | 1 | bslbf |
|     if(hdr_config_flag) { | | |
|         OETF_type | 8 | uimsbf |
|         max_mastering_display_luminance | 32 | uimsbf |
|         min_mastering_display_luminance | 32 | uimsbf |
|         average_frame_luminance_level | 32 | uimsbf |
|         max_frame_pixel_luminance | 32 | uimsbf |
|     } | | |
| } | | |
| } | | |

FIG. 48

| hdr_param_set Value | Meaning |
|---|---|
| 0 | reserved |
| 1 | EOTF : SMPTE ST2084, bit depth: 12bit/pixel, peak luminance : 10000nit, codec : HEVC dual codec (HEVC+HEVC), metadata uses SMPTE ST 2086 and SMPTE ST 2094 |
| 2 | EOTF : SMPTE ST2084, bit depth: 10bit/pixel, peak luminance : 4000nit, codec : HEVC single codec, metadata uses SMPTE ST 2086 and SMPTE ST 2094 |
| 3 | EOTF : BBC EOTF, bit depth: 10bit/pixel, peak luminance : 1000nit, codec : HEVC single codec |
| 4-255 | Reserved Future use |

FIG. 49

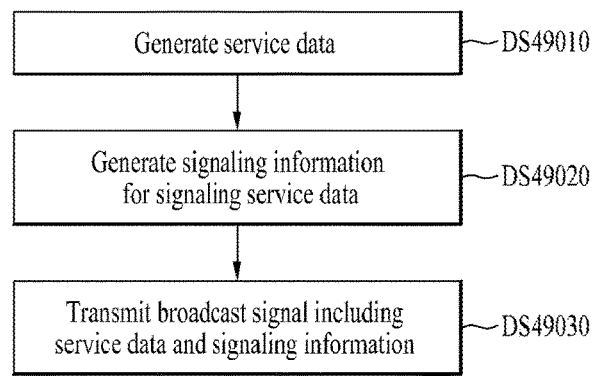

BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

CROSS-REFERENCE TO RELATED APPLICATIONS

This application is a Continuation of U.S. patent application Ser. No. 16/426,817 filed on May 30, 2019, which is a Continuation of U.S. patent application Ser. No. 15/741,952 filed on Jan. 4, 2018 (now U.S. Pat. No. 10,356,451 issued on Jul. 16, 2019), which is the National Phase of PCT International Application No. PCT/KR2016/007133 filed on Jul. 1, 2016, which claims the priority benefit under 35 U.S.C. § 119(e) to U.S. Provisional Application Nos. 62/221,102 filed on Sep. 21, 2015, 62/190,747 filed on Jul. 10, 2015, 62/190,750 filed on Jul. 10, 2015 and 62/189,164 filed on Jul. 6, 2015, all of which are hereby expressly incorporated by reference into the present application.

BACKGROUND OF THE INVENTION

Field of the Invention

The present invention relates to an apparatus for transmitting a broadcast signal, an apparatus for receiving a broadcast signal, and methods for transmitting and receiving a broadcast signal.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

SUMMARY OF THE INVENTION

A digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

The object of the present invention can be achieved by providing a system for effectively supporting a next-generation broadcast signal in an environment for supporting next-generation hybrid broadcast using a terrestrial broadcast network and the Internet and a related signaling method.

The present invention may effectively support a next-generation broadcast service in an environment for supporting next-generation hybrid broadcast using a terrestrial broadcast network and the Internet.

The present invention may support a method of providing detailed signaling with respect to service components included in a broadcast service.

The present invention may provide a method of effectively providing information on a caption in a method of transmitting a broadcast service.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 15 is a diagram showing syntax of caption related information of a color space according to an embodiment of the present invention;

FIG. 16 is a diagram showing metadata of color extension according to an embodiment of the present invention;

FIG. 18 is a diagram showing metadata for scrolling support of a caption according to an embodiment of the present invention;

FIG. 20 is a diagram showing 3D support information of a caption according to another embodiment of the present invention;

FIG. 21 is a diagram showing presentation timing option information of a caption according to an embodiment of the present invention;

FIG. 22 is a diagram showing presentation anchor time information of a caption according to an embodiment of the present invention;

FIGS. 23 and 24 are diagrams showing a method of signaling presentation anchor time of a caption using ISOBMFF according to an embodiment of the present invention;

FIG. 25 is a diagram showing scaling region information of a caption according to an embodiment of the present invention;

FIG. 26 is a diagram showing play-out speed information and aspect ratio information of a caption according to an embodiment of the present invention;

FIG. 28 is a diagram showing a method of specifying caption information in MPD according to an embodiment of the present invention;

FIG. 29 is a diagram showing a descriptor for specifying caption information in MPD according to an embodiment of the present invention;

FIG. 30 is a diagram showing caption related information included in MPD according to an embodiment of the present invention;

FIG. 31 is a diagram showing detailed information of caption related information according to an embodiment of the present invention;

FIG. 32 is a diagram showing detailed information of caption related information according to an embodiment of the present invention;

FIG. 35 is a diagram showing a portion of USBD according to another embodiment of the present invention;

FIG. 36 is a diagram showing a portion of USBD according to another embodiment of the present invention;

FIG. 37 is a diagram showing caption information according to an embodiment of the present invention;

FIG. 38 is a diagram showing caption information according to another embodiment of the present invention;

FIG. 39 is a diagram showing caption information according to another embodiment of the present invention;

FIG. 40 is a diagram showing an MMT message format according to an embodiment of the present invention;

FIG. 41 is a diagram showing a device capabilities information (DCI) table as a signaling table according to an embodiment of the present invention;

FIG. 42 is a diagram showing a part of an MP table according to an embodiment of the present invention;

FIG. 43 is a diagram showing a plurality of descriptors according to an embodiment of the present invention;

FIG. 44 is a diagram showing a method of signaling caption related information according to an embodiment of the present invention;

FIG. 45 is a diagram showing a method of signaling caption related information according to another embodiment of the present invention;

FIGS. 46 to 48 are diagrams showing a method of signaling caption related information according to another embodiment of the present invention;

FIG. 49 is a diagram showing a method of transmitting a broadcast signal according to an embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
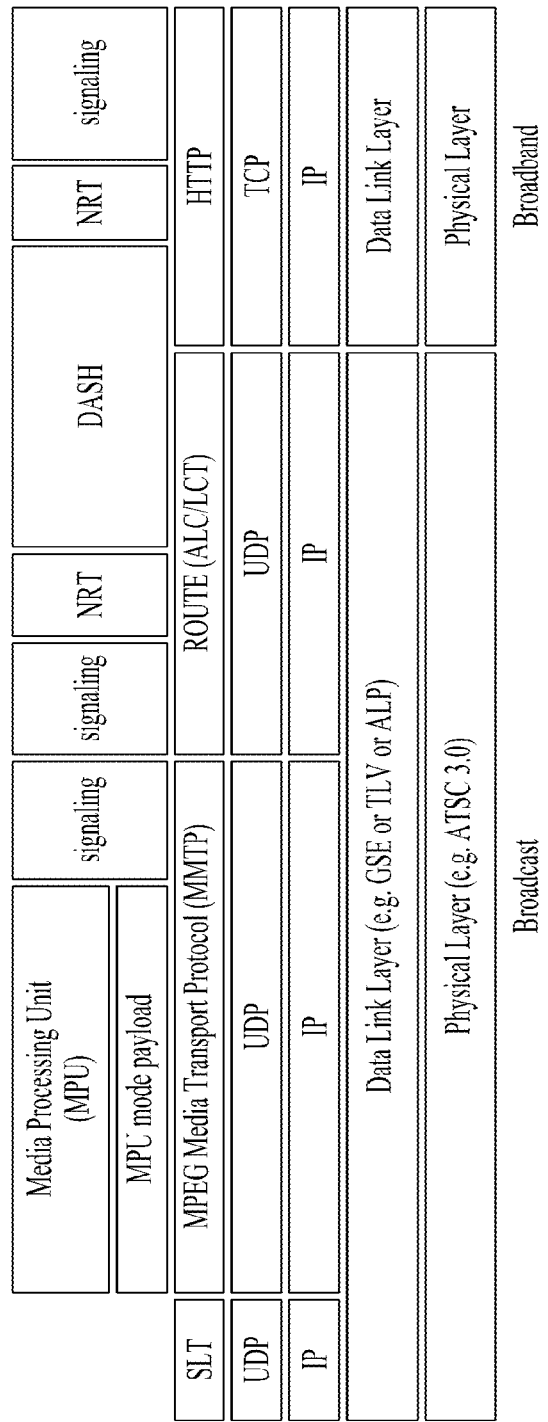
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
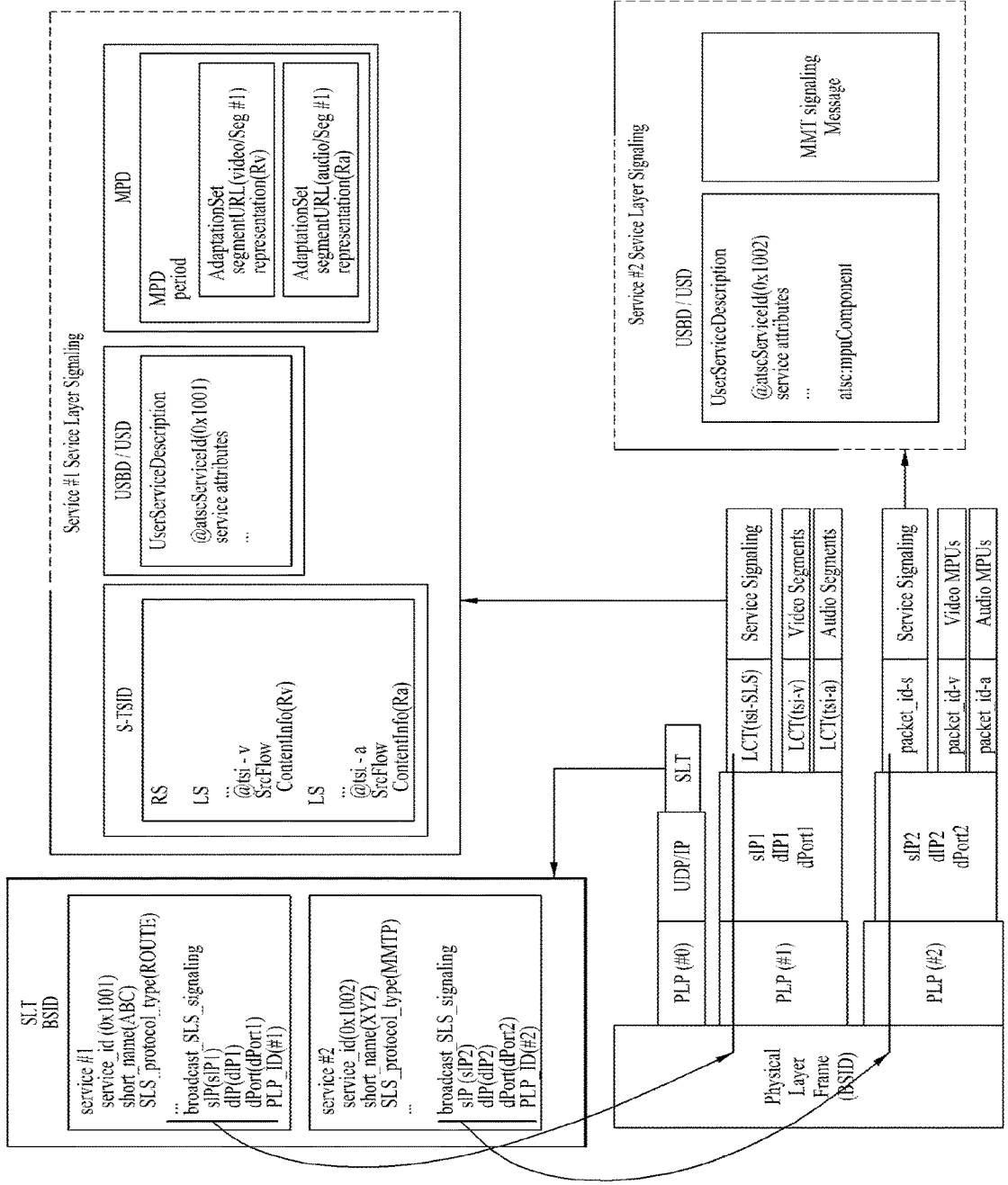
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on a RoHC method. Then, adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compressor via header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acquiring the signaling information, the receiver may combine the information to acquire mapping of service-IP information-context information PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC de compressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L1 detail signaling information of a physical layer. The LLS flag may be a flag field indicating whether the LLS is transmitted through a corresponding PLP with respect to each PLP. Here, the L1 detail signaling information may be correspond to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, as described above, the LMT may describe PLPs of all IP addresses/ports related to all service described by the SLT transmitted therewith using a PLP loop.

The signaling_type field may indicate the type of signaling information delivered by the table. The value of signaling_type field for the LMT may be set to 0x01. The signaling_type field may signaling_type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP_ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
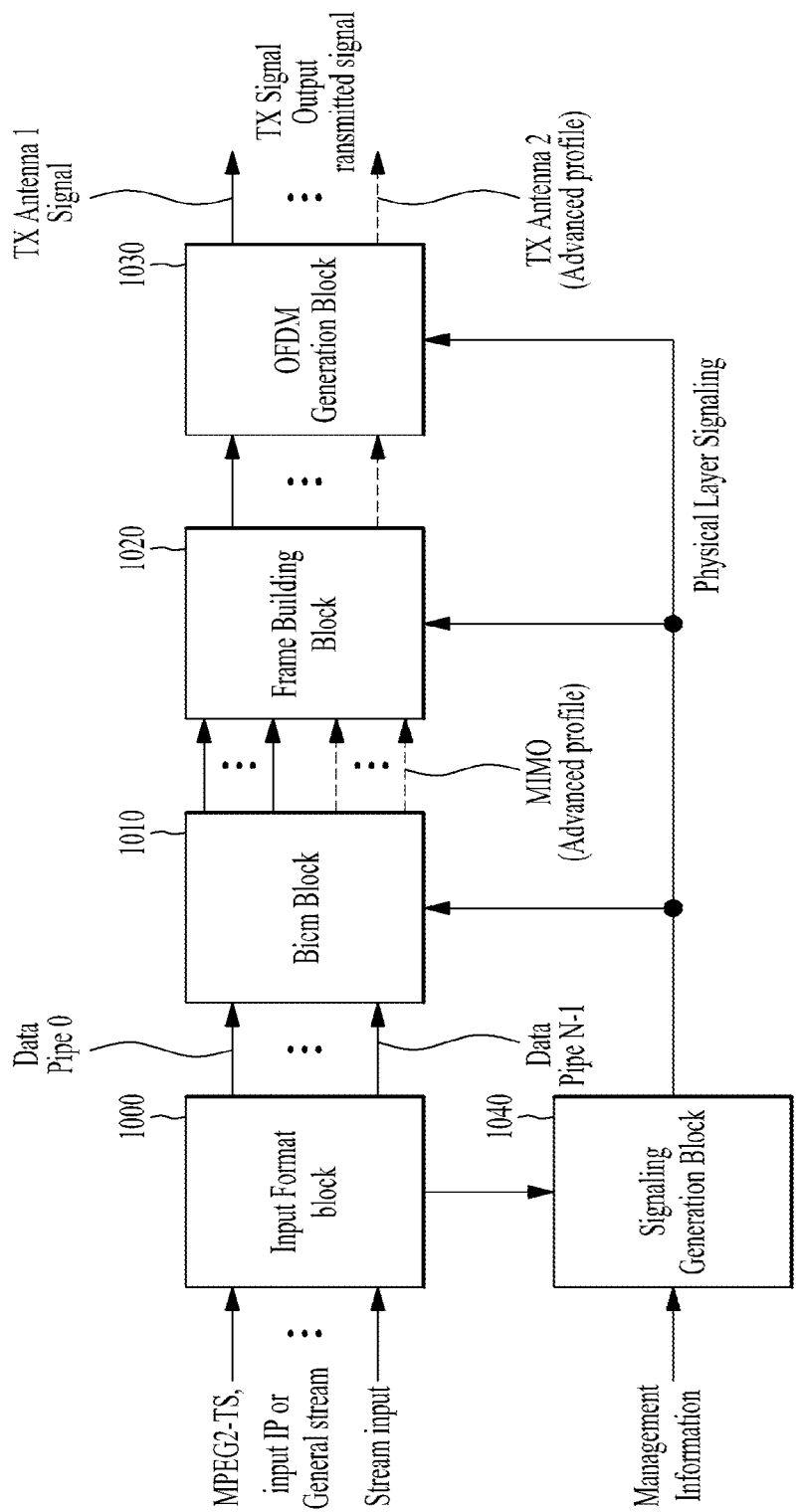
FIG. 8 is a diagram showing a structure of a broadcast signal transmission device of a next-generation broadcast service according to an embodiment of the present invention.

FIG. 8 is a diagram showing a structure of a broadcast signal transmission device of a next-generation broadcast service according to an embodiment of the present invention.

The broadcast signal transmission device of the next-generation broadcast service according to an embodiment of the present invention may include an input format block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of the present invention, input data may use IP stream/packet and MPEG2-TS as main input format and other stream types may be handled as a general stream.

The input format block 1000 may demultiplex each input stream using one or more data pipes to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components.

Since QoS is dependent upon the characteristics of a service provided by the broadcast signal transmission device of the next-generation broadcast service according to an embodiment of the present invention, data corresponding to each service needs to be processed via different methods.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block to which MIMO is not applied may include a data FEC encoder, a bit interleaver, a constellation mapper, a signal space diversity (SSD) encoding block, and a time interleaver. The processing block of the BICM block to which MIMO is applied is different from the processing block of the BICM to which MIMO is not applied in that a cell word demultiplexer and an MIMO encoding block are further included.

The data FEC encoder may perform FEC encoding on an input BBF to generate a FECBLOCK procedure using external coding (BCH) and internal coding (LDPC). The external coding (BCH) may be a selective coding method. The bit interleaver may interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and provide a power-normalized constellation point. NUQ has an arbitrary type but QAM-16 and NUQ have a square shape. All of the NUQ and the NUC may be particularly defined with respect to each code rate and signaled by parameter DP_MOD of PLS2 data. The time interleaver may be operated at a data pipe level. A parameter of the time interleaving may be differently set with respect to each data pipe.

The time interleaver according to the present invention may be positioned between the BICM chain and the frame builder. In this case, the time interleaver according to the present invention may selectively use a convolution interleaver (CI) and a block interleaver (BI) according to a physical layer pipe (PLP) mode or may use all. The PLP according to an embodiment of the present invention may be a physical path used using the same concept as the aforementioned DP and its term may be changed according to designer intention. The PLP mode according to an embodiment of the present invention may include a single PLP mode or a multiple PLP mode according to the number of PLPs processed by the broadcast signal transmitter or the broadcast signal transmission device. Time interleaving using different time interleaving methods according to a PLP mode may be referred to as hybrid time interleaving.

A hybrid time interleaver may include a block interleaver (BI) and a convolution interleaver (CI). In the case of PLP_NUM=1, the BI may not be applied (BI off) and only the CI may be applied. In the case of PLP_NUM>1, both the BI and the CI may be applied (BI on). The structure and operation of the CI applied in the case of PLP_NUM>1 may be different from those of the CI applied in the case of PLP_NUM=1. The hybrid time interleaver may perform an operation corresponding to a reverse operation of the aforementioned hybrid time interleaver.

The cell word demultiplexer may be used to divide a single cell word stream into a dual cell word stream for MIMO processing. The MIMO encoding block may process output of the cell word demultiplexer using a MIMO encoding method. The MIMO encoding method according to the present invention may be defined as full-rate spatial multiplexing (FR-SM) for providing increase in capacity via relatively low increase in complexity at a receiver side. MIMO processing may be applied at a data pipe level. When a pair of constellation mapper outputs. NUQ $e_{1,i}$ and $e_{2,i}$ is input to a MIMO encoder, a pair of MIMO encoder outputs, g1,i and g2,i may be transmitted by the same carrier k and OFDM symbol 1 of each transmission antenna.

The frame building block 1020 may map a data cell of an input data pipe in one frame to an OFDM symbol and perform frequency interleaving for frequency domain diversity.

According to an embodiment of the present invention, a frame may be divided into a preamble, one or more frame signaling symbols (FSS), and a normal data symbol. The preamble may be a special symbol for providing a combination of basic transmission parameters for effective transmission and reception of a signal. The preamble may signal a basic transmission parameter and a transmission type of a frame. In particular, the preamble may indicate whether an emergency alert service (EAS) is currently provided in a current frame. The objective of the FSS may be to transmit PLS data. For rapid synchronization and channel estimation and rapid decoding of PLS data, the FSS may have a pipe pattern with higher density than a normal data symbol.

The frame building block may include a delay compensation block for adjusting timing between a data pipe and corresponding PLS data to ensure co-time between a data pipe and corresponding PLS data at a transmitting side, a cell mapper for mapping a PLS, a data pipe, an auxiliary stream, a dummy stream, and so on to an active carrier of an OFDM symbol in a frame, and a frequency interleaver.

The frequency interleaver may randomly interleave a data cell received from the cell mapper to provide frequency diversity. The frequency interleaver may operate with respect to data corresponding to an OFDM symbol pair including two sequential OFDM symbols or data corresponding to one OFDM symbol using different interleaving seed orders in order to acquire maximum interleaving gain in a single frame.

The OFDM generation block 1030 may modulate an OFDM carrier by the cell generated by the frame building block, insert a pilot, and generate a time domain signal for transmission. The corresponding block may sequentially insert guard intervals and may apply PAPR reduction processing to generate a last RF signal.

The signaling generation block 1040 may generate physical layer signaling information used in an operation of each functional block. The signaling information according to an embodiment of the present invention may include PLS data.

The PLS may provide an element for connecting a receiver to a physical layer data pipe. The PLS data may include PLS1 data and PLS2 data.

The PLS1 data may be a first combination of PLS data transmitted to FSS in a frame with fixed size, coding, and modulation for transmitting basic information on a system as well as a parameter required to data PLS2 data. The PLS1 data may provide a basic transmission parameter including a parameter required to receive and decode PLS2 data. The PLS2 data may be a second combination of PLP data transmitted to FSS for transmitting more detailed PLS data of a data pipe and a system. PLS2 signaling may further include two types of parameters of PLS2 static data (PLS2-STAT data) and PLS2 dynamic data (PLS2-DYN data). The PLS2 static data may be PLS2 data that is static during duration of a frame group and the PLS2 dynamic data may be PLS2 data that is dynamically changed every frame.

The PLS2 data may include FIC_FLAG information. A fast information channel (FIC) may be a dedicated channel for transmitting cross-layer information for enabling fast service acquisition and channel scanning. The FIC_FLAG information may indicate whether a fast information channel (FIC) is used in a current frame group via a 1-bit field. When a value of the corresponding field is set to 1, the FIC may be provided in the current frame. When a value of the corresponding field is set to 0, the NC may not be transmitted in the current frame. The BICM block 1010 may include a BICM block for protecting PLS data. The BICM block for protecting the PLS data may include a PLS FEC encoder, a bit interleaver, and a constellation mapper.

The PLS FEC encoder may include a scrambler for scrambling PLS1 data and PLS2 data, a BCH encoding/zero inserting block for performing external encoding on the scrambled PLS 1 and 2 data using a BCH code shortened for PLS protection and inserting a zero bit after BCH encoding, a LDPC encoding block for performing encoding using an LDPC code, and an LDPC parity puncturing block. Only the PLS1 data may be permutated before an output bit of zero insertion is LDPC-encoded. The bit interleaver may interleave each of the shortened and punctured PLS1 data and PLS2 data, and the constellation mapper may map the bit-interleaved PLS1 data and PLS2 data to constellation.

A broadcast signal reception device of a next-generation broadcast service according to an embodiment of the present invention may perform a reverse operation of the broadcast signal transmission device of the next-generation broadcast service that has been described with reference to FIG. 8.

The broadcast signal reception device of a next-generation broadcast service according to an embodiment of the present invention may include a synchronization & demodulation module for performing demodulation corresponding to a reverse operation performed by the broadcast signal transmission device, a frame parsing module for parsing an input signal frame to extract data transmitted by a service selected by a user, a demapping & decoding module for converting an input signal into hit region data, deinterleaving bit region data as necessary, performing demapping on mapping applied for transmission efficiency, and correcting error that occurs in a transmission channel for decoding, an output processor for performing a reverse operation of various compression/signal processing procedures applied by the broadcast signal transmission device, and a signaling decoding module for acquiring and processing PLS information from the signal demodulated by the synchronization & demodulation module. The frame parsing module, the demapping & decoding module, and the output processor may perform the functions using the PLS data output from the signaling decoding module.

Hereinafter, the timer interleaver will be described. A time interleaving group according to an embodiment of the present invention may be directly mapped to one frame or may be spread over $P_1$ frames. In addition, each time interleaving group may be divided into one or more ($N_{TI}$) time interleaving blocks. Here, each time interleaving block may correspond to one use of a time interleaver memory. A time interleaving block in the time interleaving group may include different numbers of XFECBLOCK. In general, the time interleaver may also function as a buffer with respect to data pipe data prior to a frame generation procedure.

The time interleaver according to an embodiment of the present invention may be a twisted row-column block interleaver. The twisted row-column block interleaver according to an embodiment of the present invention may write a first XFECBLOCK in a first column of the time interleaving memory, write a second XFECBLOCK in a next column, and write the remaining XFECBLOCKs in the time interleaving block in the same manner. In an interleaving array, a cell may be read in a diagonal direction to a last row from a first row (a leftmost column as a start column is read along a row in a right direction). In this case, to achieve single memory deinterleaving at a receiver side irrespective of the number of XFECBLOCK in the time interleaving block, the interleaving array for the twisted row-column block interleaver may insert a virtual XFECBLOCK into the time interleaving memory. In this case, to achieve single memory deinterleaving at a receiver side, the virtual XFECBLOCK needs to be inserted into another frontmost XFECBLOCK.

Figure 9:
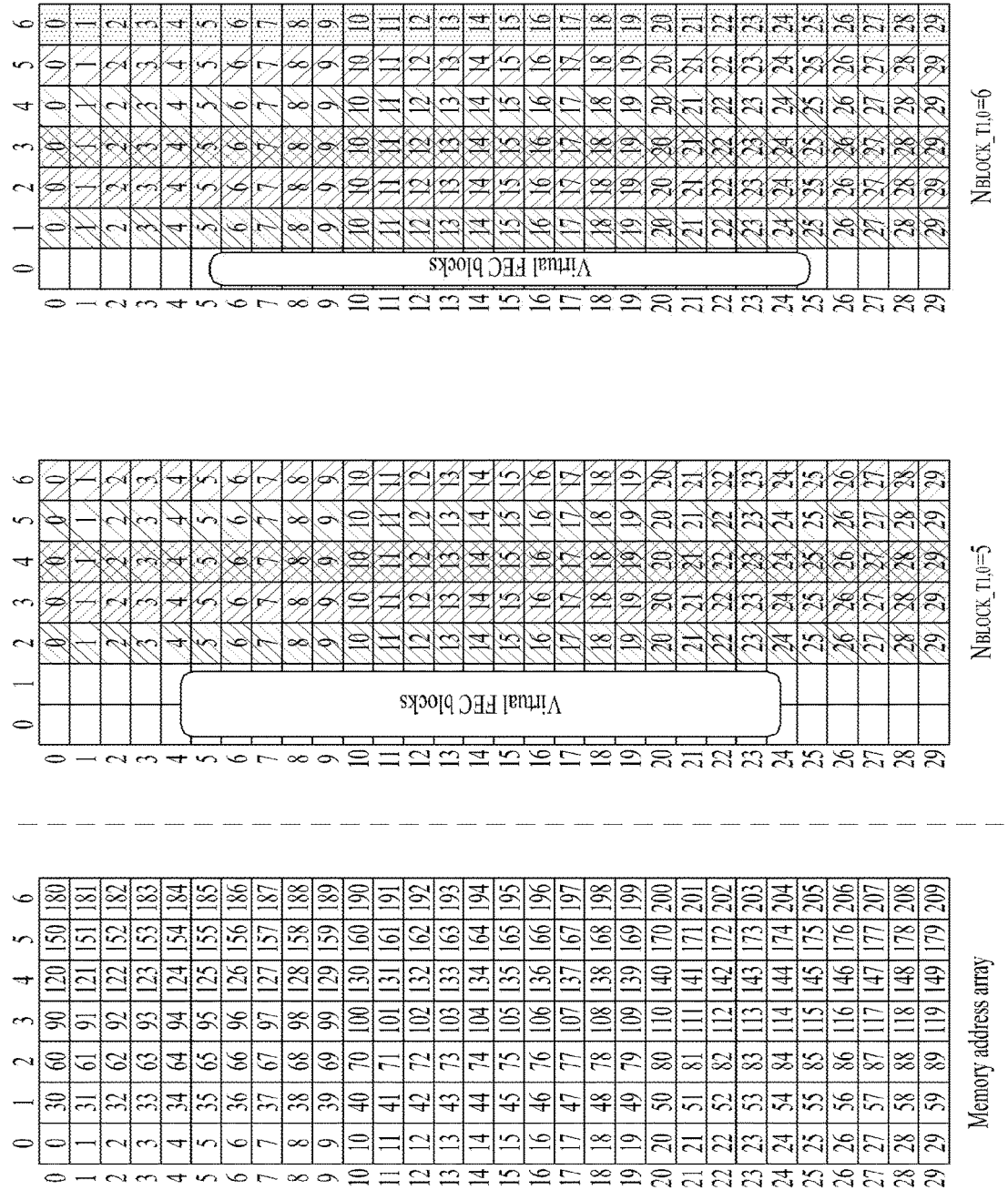
FIG. 9 is a diagram showing a writing operation of a time interleaver according to an embodiment of the present invention.

FIG. 9 is a diagram showing a writing operation of a time interleaver according to an embodiment of the present invention.

A block shown in a left portion of the drawing shows a TI memory address array and a block shown in a right portion of the drawing shows a writing operation when two or one virtual FEC blocks are inserted into a frontmost group of TI groups with respect to two consecutive TI groups.

The frequency interleaver according to an embodiment of the present invention may include an interleaving address generator for generating an interleaving address to be applied to data corresponding to a symbol pair.

Figure 10:
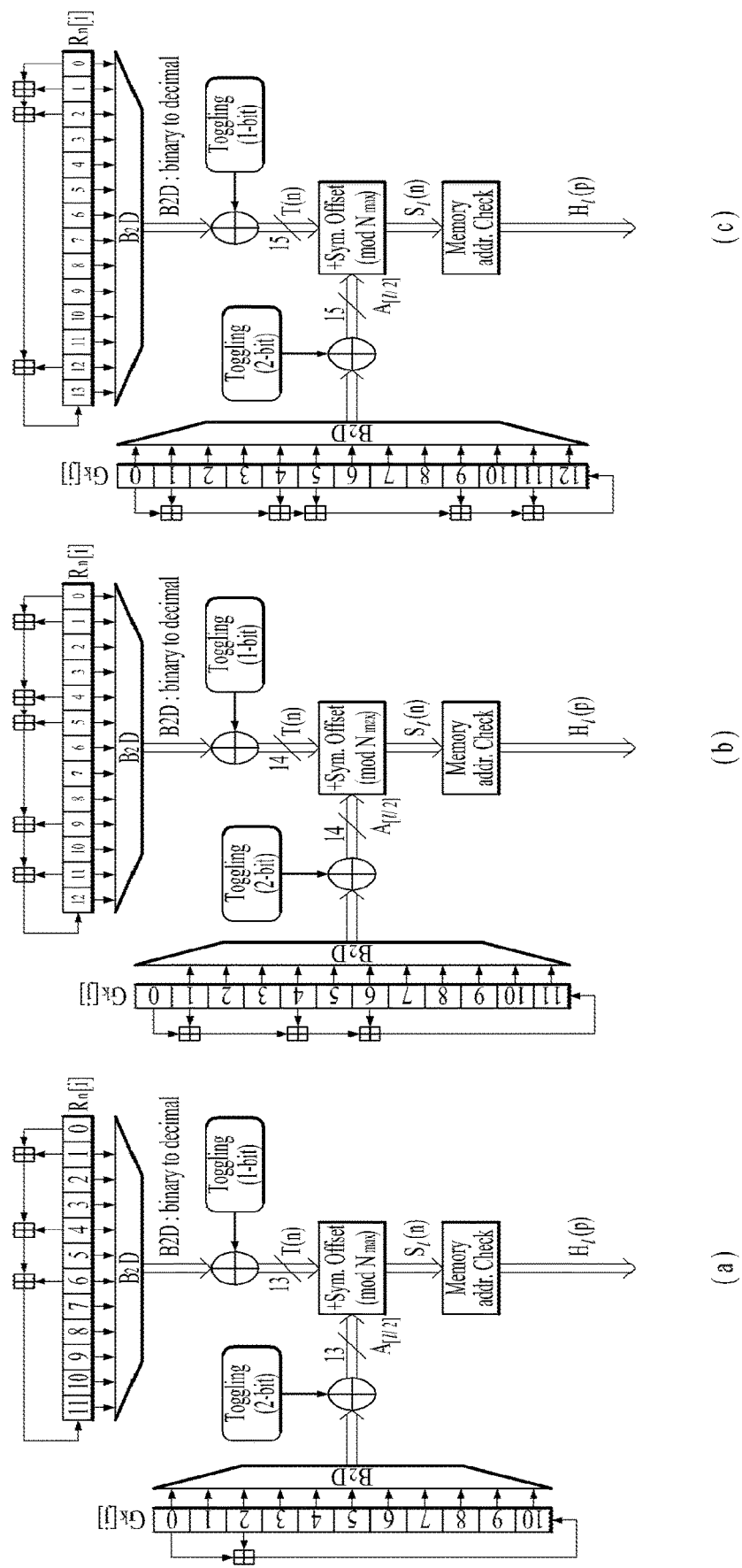
FIG. 10 is a block diagram of an interleaving address generator including a main-PRBS generator and a sub-PRBS generator according to each HT mode, included in the frequency interleaver; according to an embodiment of the present invention.

FIG. 10 is a block diagram of an interleaving address generator including a main-PRBS generator and a sub-PRBS generator according to each FFT mode, included in the frequency interleaver, according to an embodiment of the present invention.

(a) is a block diagram of an interleaving address generator with respect to a 8K FFT mode, (b) is a block diagram of an interleaving address generator with respect to a 16K FFT mode, and (c) is a block diagram of an interleaving address generator with respect to a 32K FFT mode.

An interleaving procedure with respect to an OFDM symbol pair may use one interleaving sequence and will be described below. First, an available data cell (output cell from a cell mapper) to be interleaved in one OFDM symbol $O_{m,l}$ may be defined as $O_{m,l}=[x_{m,l,0}, \ldots, x_{m,l,p}, \ldots, x_{m,l,N_{data-1}}]$ with respect to l=0, ..., $N_{sym}-1$. In this case, $x_{m,l,p}$ may be a $p^{th}$ cell of a $l^{th}$ OFDM symbol in a $m^{th}$ frame and $N_{data}$ may be the number of data cells. In the case of a frame signaling symbol, $N_{data}=C_{FSS}$, in the case of normal data, $N_{data}=C_{data}$, and in the case of a frame edge symbol, $N_{data}=C_{FES}$. In addition, the interleaving data cell may be defined as $P_{m,l}=[v_{m,l,0}, \ldots, v_{m,l,N_{data-1}}]$ with respect to l=0, ..., $N_{sym}-1$.

With respect to an OFDM symbol pair, an interleaved OFDM symbol pair may be given according to $v_{m,l,Hi(p)} = x_{m,l,p}$, $p=0, \ldots, N_{data}-1$ for a first OFDM symbol of each pair and given according to $v_{m,l,p} = x_{m,l,Hi(p)}$, $p=0, \ldots, N_{data}-1$ for a second OFDM symbol of each pair. In this case, $H_1(p)$ may be an interleaving address generated based on a cyclic shift value (symbol offset) of a PRBS generator and a sub-PRBS generator.

Figure 11:
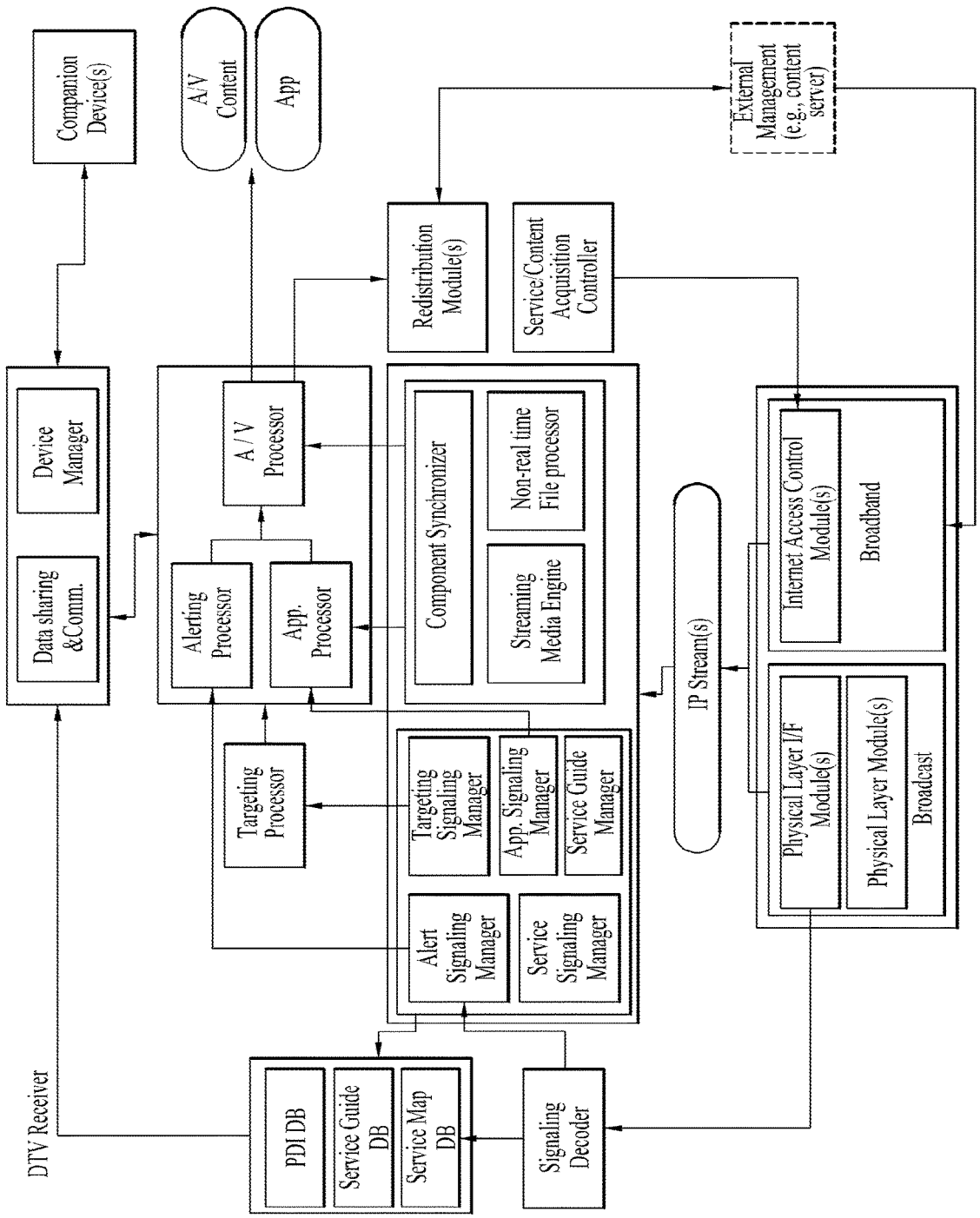
FIG. 11 is a block diagram illustrating a hybrid broadcast reception apparatus according to an embodiment of the present invention.

FIG. 11 is a block diagram illustrating a hybrid broadcast reception apparatus according to an embodiment of the present invention.

A hybrid broadcast system can transmit broadcast signals in connection with terrestrial broadcast networks and the Internet. The hybrid broadcast reception apparatus can receive broadcast signals through terrestrial broadcast networks (broadcast networks) and the Internet (broadband). The hybrid broadcast reception apparatus may include physical layer module(s), physical layer I/F module(s), service/content acquisition controller. Internet access control module(s), a signaling decoder, a service signaling manager, a service guide manager, an application signaling manager, an alert signal manager, an alert signaling parser, a targeting signaling parser, a streaming media engine, a non-real time file processor, a component synchronizer, a targeting processor, an application processor, an A/V processor, a device manager, a data sharing and communication unit, redistribution module(s), companion device(s) and/or an external management module.

The physical layer module(s) can receive a broadcast related signal through a terrestrial broadcast channel, process the received signal, convert the processed signal into an appropriate format and deliver the signal to the physical layer I/F module(s).

The physical layer I/F module(s) can acquire an IP datagram from information obtained from the physical layer module. In addition, the physical layer I/F module can convert the acquired IP datagram into a specific frame (e.g., RS frame, GSE, etc.).

The service/content acquisition controller can perform control operation for acquisition of services, content and signaling data related thereto through broadcast channels and/or broadband channels.

The Internet access control module(s) can control receiver operations for acquiring service, content, etc. through broadband channels.

The signaling decoder can decode signaling information acquired through broadcast channels.

The service signaling manager can extract signaling information related to service scan and/or content from the IP datagram, parse the extracted signaling information and manage the signaling information.

The service guide manager can extract announcement information from the IP datagram, manage a service guide (SG) database and provide a service guide.

The application signaling manager can extract signaling information related to application acquisition from the IP datagram parse the signaling information and manage the signaling information.

The alert signaling parser can extract signaling information related to alerting from the IP datagram, parse the extracted signaling information and manage the signaling information.

The targeting signaling parser can extract signaling information related to service/content personalization or targeting from the IP datagram, parse the extracted signaling information and manage the signaling information. In addition, the targeting signaling parser can deliver the parsed signaling information to the targeting processor.

The streaming media engine can extract audio/video data for A/V streaming from the IP datagram and decode the audio/video data.

The non-real time file processor can extract NRT data and file type data such as applications, decode and manage the extracted data.

The component synchronizer can synchronize content and services such as streaming audio/video data and NRT data.

The targeting processor can process operations related to service/content personalization on the basis of the targeting signaling data received from the targeting signaling parser.

The application processor can process application related information and downloaded application state and represent parameters.

The A/V processor can perform audio/video rendering related operations on the basis of decoded audio/video data and application data.

The device manager can perform connection and data exchange with external devices. In addition, the device manager can perform operations of managing external devices connectable thereto, such as addition/deletion/update of the external devices.

The data sharing and communication unit can process information related to data transmission and exchange between a hybrid broadcast receiver and external devices. Here, data that can be transmitted and exchanged between the hybrid broadcast receiver and external devices may be signaling data, A/V data and the like.

The redistribution module(s) can acquire information related to future broadcast services and content when the broadcast receiver cannot directly receive terrestrial broadcast signals. In addition, the redistribution module can support acquisition of future broadcast services and content by future broadcast systems when the broadcast receiver cannot directly receive terrestrial broadcast signals.

The companion device(s) can share audio, video or signaling data by being connected to the broadcast receiver according to the present invention. The companion device may be an external device connected to the broadcast receiver.

The external management module can refer to a module for broadcast services/content provision. For example, the external management module can be a future broadcast services/content server. The external management module may be an external device connected to the broadcast receiver.

Figure 12:
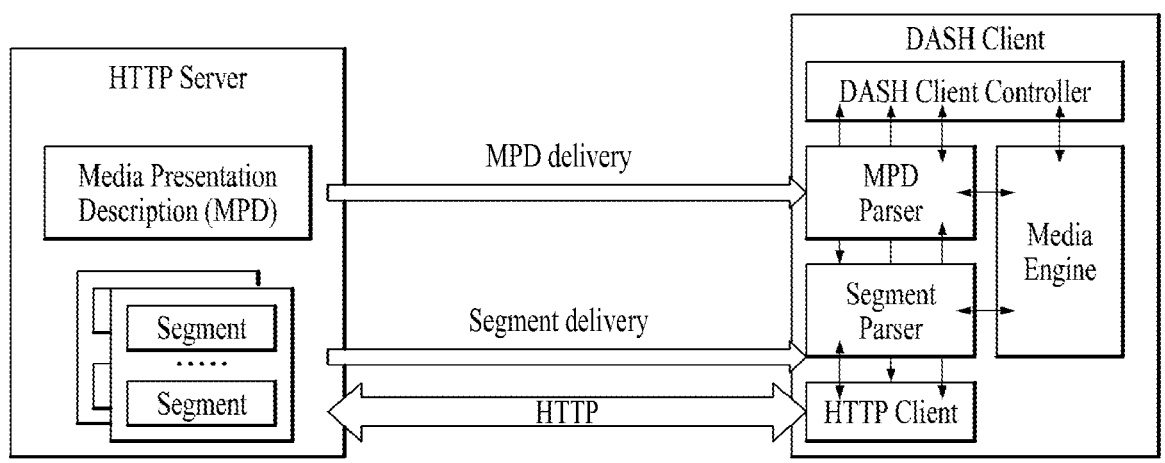
FIG. 12 is a diagram showing an overall operation of a DASH-based adaptive streaming model according to an embodiment of the present invention.

FIG. 12 is a diagram showing an overall operation of a DASH-based adaptive streaming model according to an embodiment of the present invention.

The present invention proposes a next-generation media service providing method for providing content including a caption. The present invention proposes related metadata and a method of transmitting the metadata when caption information is provided. Thereby, content may be adaptively adjusted and may be provided with a caption.

In the case of UHD broadcast, etc., brightness that is not capable of being expressed by existing content, thereby providing sense of high realism. By virtue of introduction of HDR, an expression range of brightness of a content image is increased and, thus, a difference between characteristics for respective scenes of content may be increased compared with a previous case. To effectively express a caption with HDR, metadata may be defined and transmitted to a receiver. An image of content may be appropriately provided according to intention of a service provider or receiver performance based on the metadata received by the receiver.

The present invention proposes a method of signaling a method of displaying a caption based on a media file such as ISOBMFF. The present invention proposes a method of storing and signaling caption information related to a video track (stream). The present invention proposes a method of storing and signaling a video sample, a video sample group, or caption information related to a video sample entry.

The method of transmitting/transmitting caption information according to the present invention may be used to generate content for supporting 3D. That is, when a media file of content for supporting a caption is generated, a DASH segment operating in MPEG DASH is generated, or MPU operating in MPEG MMT is generated, the method according to the present invention may be used. A receiver (which includes a DASH client, an MMT client, or the like) may acquire caption information (flag, parameter, box, etc.) from a decoder and so on and may effectively provide corresponding content based on the information.

The DASH-based adaptive streaming model according to the illustrated embodiment may write an operation between an HTTP server and a DASH client. Here, a dynamic adaptive streaming over HTTP (DASH) may be a protocol for supporting HTTP-based adaptive streaming and may dynamically support streaming according to a network situation. Accordingly, AV content reproduction may be seamlessly provided.

First, the DASH client may acquire MPD. The MPD may be transmitted from a service provider such as a HTTP server. The MPD may be transmitted according to delivery according to the aforementioned embodiment. The DASH client may request a server of corresponding segments using access information to a segment described in the MPD. Here, the request may reflect a network state and may be performed.

The DASH client may acquire a corresponding segment and, then, process the segment in a media engine and, then, display the segment on a screen. The DASH client may reflect a reproduction time and/or a network situation in real time and make a request for and acquire a required segment (Adaptive Streaming). Thereby, content may be seamlessly reproduced.

The media presentation description (MPD) may be represented in the form of XML as a file containing detailed information for permitting the DASH client to dynamically acquire a segment. In some embodiments, the MPD may be the same as the aforementioned MPD.

A DASH client controller may reflect a network situation to generate a command for making a request for MPD and/or a segment. The controller may control the acquired information to be used in an internal block such as a media engine.

A MPD parser may parse the acquired MPD in real time. Thereby, the DASH client controller may generate a command for acquiring a required segment.

A segment parser may parse the acquired segment in real time. Internal blocks such as a media engine may perform a specific operation according to information included in a segment.

A HTTP client may make a request for required MPD and/or segment to a HTTP server. The HTTP client may transmit the MPD and/or segments acquired from the server to the MPD parser or the segment parser.

The media engine may display content on a screen using media data included in a segment. In this case, information of the MPD may be used.

Figure 13:
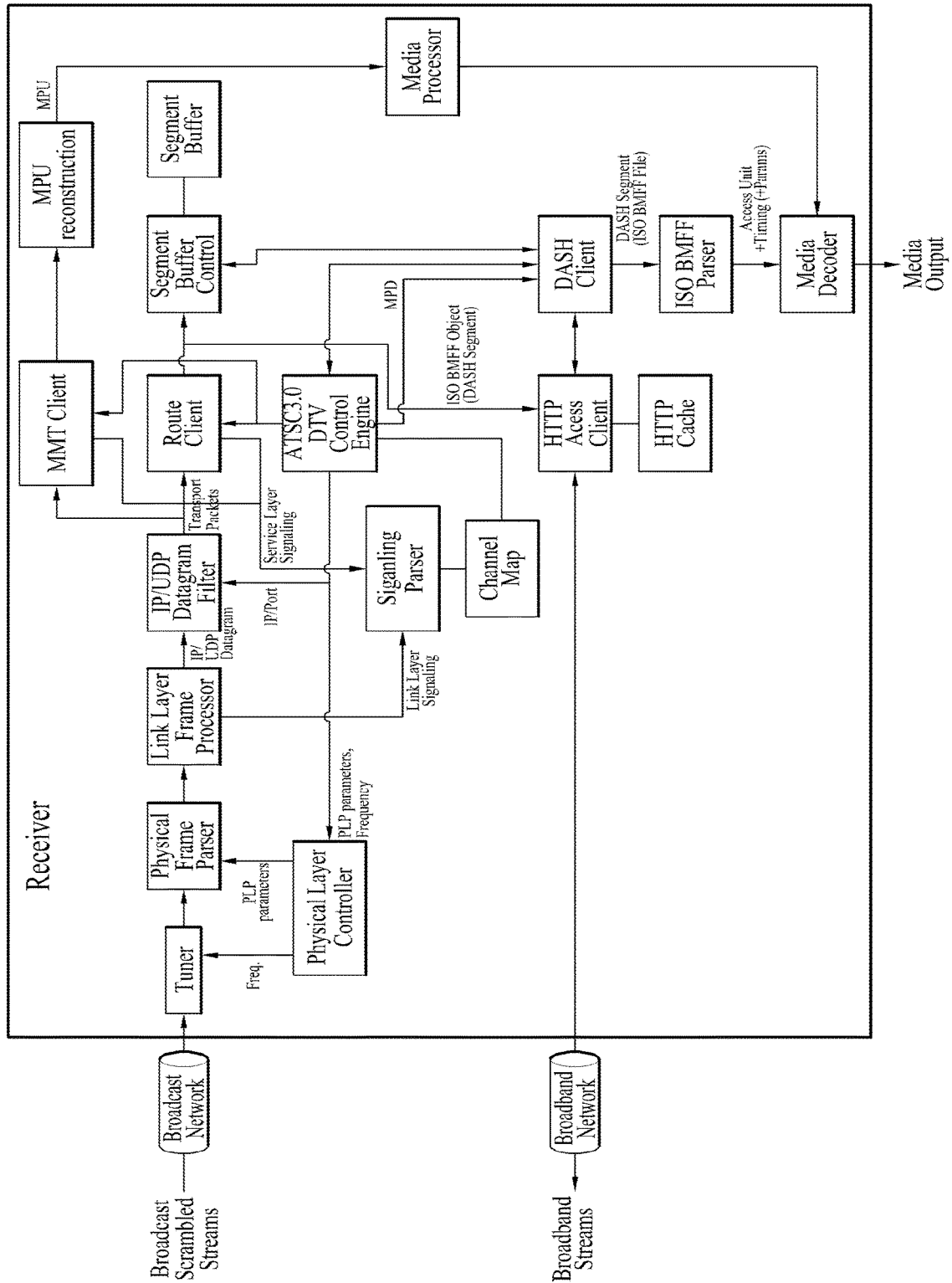
FIG. 13 is a block diagram of a receiver according to an embodiment of the present invention.

FIG. 13 is a block diagram of a receiver according to an embodiment of the present invention.

The receiver according to the illustrated embodiment may include a tuner, a physical layer controller, a physical frame parser, a link layer frame processor, an IP/UDP datagram filter, a DTV control engine, a route client, a segment buffer control, an MMT client, an MPU reconstruction, a media processor, a signaling parser, a DASH client, an ISO BMFF parser, a media decoder, and/or an HTTP access client. Each detailed block of the receiver may be a hardware processor.

The tuner may receive and process a broadcast signal through a terrestrial broadcast channel to tune the broadcast signal in a proper form (physical frame, etc.). The physical layer controller may control operations of the tuner, the physical frame parser, etc. using RF information, etc. of a broadcast channel as a reception target. The physical frame parser may parse the received physical frame and acquire a link layer frame, etc. via processing related to the physical frame.

The link layer frame processor may acquire link layer signaling, etc. from the link layer frame or may acquire IP/UDP datagram and may perform related calculation. The IP/UDP datagram filter may filter specific IP/UDP datagram from the received IP/UDP datagram. The DTV control engine may mange an interface between components and control each operation via transmission of a parameter, etc.

The route client may process a real-time object delivery over unidirectional transport (ROUTE) packet for supporting real-time object transmission and collect and process a plurality of packets to generate one or more base media file format (ISOBMFF) objects. The segment buffer control may control a buffer related to segment transmission between the route client and the dash client.

The MMT client may process a MPEG media transport (MMT) transport protocol packet for supporting real-time object transmission and collect and process a plurality of packets. The MPU reconstruction may reconfigure a media processing unit (MPU) from the MMTP packet. The media processor may collect and process the reconfigured MPU.

The signaling parser may acquire and parse DTV broadcast service related signaling (link layer/service layer signaling) and generate and/or manage a channel map, etc. based thereon. This component may process low level signaling and service level signaling.

The DASH client may perform real-time streaming or adaptive streaming related calculation and process the acquired DASH segment, etc. The ISO BMFF parser may extract data of audio/video, a related parameter, and so on from the ISO BMFF object. The media decoder may process decoding and/or presentation of the received audio and video data. The HTTP access client may make a request for specific information to the HTTP server and process response to the request.

Figure 14:
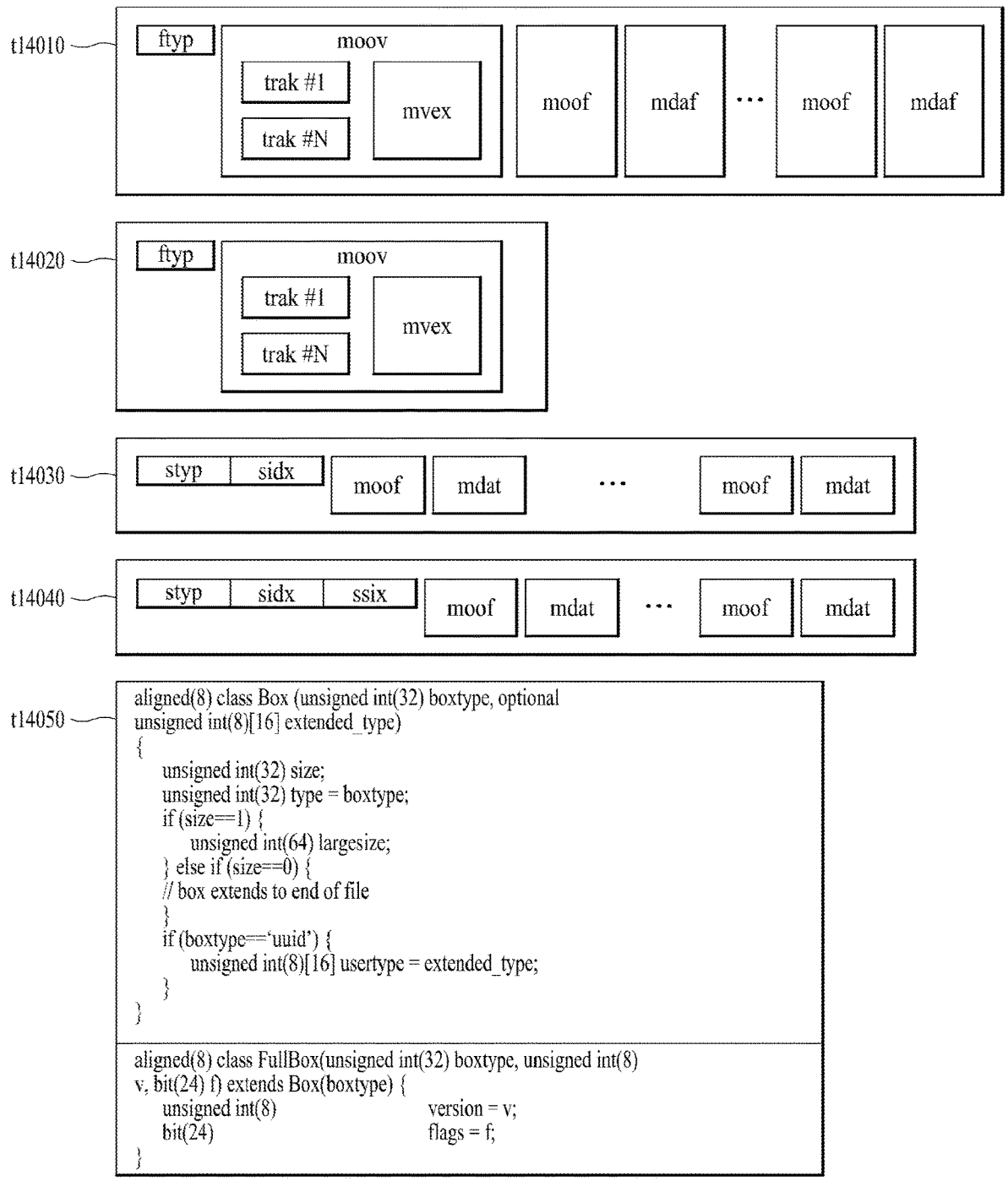
FIG. 14 is a diagram showing a configuration of a media file according to an embodiment of the present invention.

FIG. 14 is a diagram showing a configuration of a media file according to an embodiment of the present invention.

To store and transmit media data such as audio or video, formalized media file format may be defined. In some embodiments, the media file according to the present invention may have a file format based on ISO base media file format (ISO BMFF).

The media file according to the present invention may include at least one box. Here, the box may be a data block or object including media data or metadata related to media data. Boxes may be an inter-hierarchical structure and, thus, media may be classified according to the inter-hierarchical structure such that a media file has a format appropriate to store and/or transmit large-scale media data. The media file may have a structure for easily accessing media information, for example, a structure for permitting a user to move a specific point of media content.

The media file according to the present invention may include a ftyp box, a moov box, and/or a mdat box.

The ftyp box (file-type box) may provide a file type or compatibility related information of a corresponding media file. The ftyp box may include configuration version information of media data of a corresponding media file. A decoder may identify a corresponding media file with reference to the ftyp box.

The moov box (movie box) may be a box including metadata of media data of a corresponding media file. The moov box may function as a container of all metadata. The moov box may be a box of an uppermost layer among metadata related boxes. In some embodiments, only one moov box may be present in a media file.

The mdat box (media data box) may be a box containing actual media data of a corresponding media file. The media data may include an audio sample and/or video samples and the mdat box may function as a container containing the media samples.

In some embodiments, the aforementioned moov box may further include a mvhd box, a trak box, and/or a mvex box as a lower box.

The mvhd box (movie header box) may include media presentation related information of media data included in a corresponding media file. That is, the mvhd box may include information such as media generation time, change time, time interval, period, etc. of corresponding media presentation.

The trak box (track box) may provide information related to a track of corresponding media data. The trak box may include information such as stream related information, presentation related information, and access related information of an audio track or a video track. A plurality of trak boxes may be present according to the number of tracks.

In some embodiments, the trak box may further include a tkhd box (track header box) as a lower box. The tkhd box may include information on a corresponding track indicated by the trak box. The tkhd box may include information such as generation time, change time, and track identifier of a corresponding track.

The mvex box (movie extend box) may indicate that the below-described moof box is present in a corresponding media file. To know all media samples of a specific track, moof boxes need to be scanned.

In some embodiments, the media file according to the present invention may be divided into a plurality of fragments (t14010). Thereby, the media file may be segmented and stored or transmitted. Media data (mdat box) of the media file may be segmented into a plurality of fragments and each fragment may include a moof box and the segmented mdat box. In some embodiments, to use fragments, information of the ftyp box and/or the moov box may be required.

The moof box (movie fragment box) may provide metadata of media data of a corresponding fragment. The moof box may be a box of an uppermost layer among metadata related boxes of a corresponding fragment.

The mdat box (media data box) may include actual media data as described above. The mdat box may include media samples of media data corresponding to each corresponding fragment.

In some embodiments, the aforementioned moof box may include a mfhd box and/or a traf box as a lower box.

The mfhd box (movie fragment header box) may include information related to a relationship of a plurality of fragmented fragments. The mfhd box may include a sequence number and may indicate a sequence of data obtained by segmenting media data of a corresponding fragment. Whether segmented data is omitted may be checked using the mfhd box.

The traf box (track fragment box) may include information on a corresponding track fragment. The traf box may provide metadata of a segmented track fragment included in a corresponding fragment. The traf box may provide metadata to decode/reproduce media samples in a corresponding track fragment. A plurality of traf boxes may be present according to the number of track fragments.

In some embodiments, the aforementioned traf box may include a tfhd box and/or a trun box as a lower box.

The tfhd box (track fragment header box) may include header information of a corresponding track fragment. The tfhd box may provide information of a basic sample size, period, offset, and identifier with respect to media samples of a track fragment indicated by the aforementioned traf box.

The trun box (track fragment run box) may include corresponding track fragment related information. The trun box may include information such as a period, size, and reproduction time for each media sample.

The aforementioned media file and fragments of the media file may be processed and transmitted as segments. The segment may include initialization segment and/or media segment.

A file according to the illustrated embodiment t14020 may be a file containing information related to initialization of a media decoder except for media data. The file may correspond to, for example, the aforementioned initialization segment. The initialization segment may include the aforementioned ftyp box and/or moov box.

A file according to the illustrated embodiment t14030 may be a file containing the aforementioned fragment. The file may correspond to, for example, the aforementioned media segment. The media segment may include the aforementioned moof box and/or mdat box. The media segment may further include a styp box and/or a sidx box.

The styp box (segment type box) may provide information for identifying media data of a segmented fragment. The styp box may perform the same function as the aforementioned ftyp box with respect to the segmented fragment. In some embodiments, the styp box may have the same format as the ftyp box.

The sidx box (segment index box) may provide information indicating an index of a segmented fragment. Thereby, the box may indicate a sequence of the corresponding segmented fragment.

In some embodiments (t14040), a ssix box may be further included and the ssix box (sub segment index box) may be further segmented into sub segments and, in this case, may provide information indicating an index of the sub segment.

Boxes of a media file may include further extended information based on the box and FullBox form shown in the illustrated embodiment t14050. In this embodiment, a size field and a largesize field may indicate a length of a corresponding box in units of bytes. The version field may indicate a version of a corresponding box format. The type field may indicate a type and identifier of a corresponding box. The flags field may indicate a flag, etc. related to a corresponding box.

FIG. 15 is a diagram showing syntax of caption related information of a color space according to an embodiment of the present invention. The caption related information transmitted with a broadcast signal may consider the following factors. First, compatibility of design may be considered. The caption information needs to have compatibility of design of media content and, in this regard, the compatibility of design may be defined as characteristics in that corresponding caption information is capable of being commonly used without a separate operation with respect to a plurality of different applications. That is, the compatibility of design may indicate that corresponding caption information is applicable to a plurality of applications a plurality of times in the case of single implementation of caption information. Secondly, visibility of text may be considered. Visibility of text included in caption information needs to be maintained according to intention of a manufacturer of a caption. Thirdly, personalization may be considered. With regard to the caption information, caption attribute, for example, indicating font size and color may be changed based on user setting. Based on the considered factors, the present invention may proposes use of society of motion picture and television engineers (SMPTE) timed text (SMPTE-TT) that is one type of a TTML for generation of caption information for a broadcast system. The caption information may further include metadata for a caption text as well as the caption text. Hereinafter, a signaling method of adding metadata to a TTML and transmitting the metadata will be specified. The metadata may include information for visibility of a caption, information user control of the caption, and presentation timing information of the caption. The information for visibility of the caption may include an intended color space intended according to a caption manufacturer, 3D caption support information, and scrolling information. The caption information for user control may include information for allowing variation in a size of caption regions when user control is enabled with respect to a caption. In addition, the presentation timing information of the caption may indicate anchor time of presentation.

Information on the intended color space may provide the following effect. The intended color space may enable a caption manufacturer to user other color spaces other than standard RGB (sRGB). The information on the intended color space may detail information for defining a caption text and a caption region. Here, the color space of the caption region may be defined for each color of a foreground and a background. There may be two methods of defining the information on the intended color space. As a first method, a name of a pre-defined color space is specified. For example, like BT. 2020 and DCI-P3, a name of a pre-defined color space may be specified in metadata. As shown in the drawing, when metadata of a color space specifies "BT709" or "BT2020", numerical values that are pre-defined with respect to a color space BT709 or BT2020 may be used as color space information. For example, when BT709 is specified in metadata, xRed, yRed, xGreen, yGreen, xBlue, yBlue, xWhite, and yWhite may have values of 6400, 3300, 3000, 6000, 1500, 600, 3127, and 3290, respectively. As a second method, CIExy coordinates of red, green, blue, and white points associated with a color space may be directly specified. This method may be a general approach method for flexibly specifying a color space. In the shown syntax, xRed, yRed, xGreen, yGreen, xBlue, yBlue, xWhite, and yWhite may be represented as a value of 10000 times of an original value of CIExy coordinates of red, green, blue, and white points associated with a color space.

FIG. 16 is a diagram showing metadata of color extension according to an embodiment of the present invention. To specify the aforementioned color of a foreground and a background with the aforementioned color of a color space, metadata of color extension may be additionally defined. In this case, information of an intended color space may include 8 bits or more. Color extension information of the foreground may be defined as tts:colorExt in metadata. tts:colorExt attribute may be used to specify a property that defines the foreground color of marks associated with an area generated by content flowed into a region when more than 8 bits are used for color. A value of tts:colorExt may be defined by <colorExt> and an application target may be span. Color extension information of a background may be defined as tts:backgroundColorExt in metadata. tts:backgroundColorExt attribute is used to specify a property that defines the background color of a region or an area generated by content flowed into a region when other color space rather than SRGB color space is applicable. A value of tts:backgroundColorExt may be defined by <colorExt> and an application target may be body, div, p, region, and span. <colorExt> shown in a lower part of the drawing may represent a value of color applied to color extension and may represent r-value, g-value, b-value, and/or a-value according to a size of <colorExt>.

Figure 17:
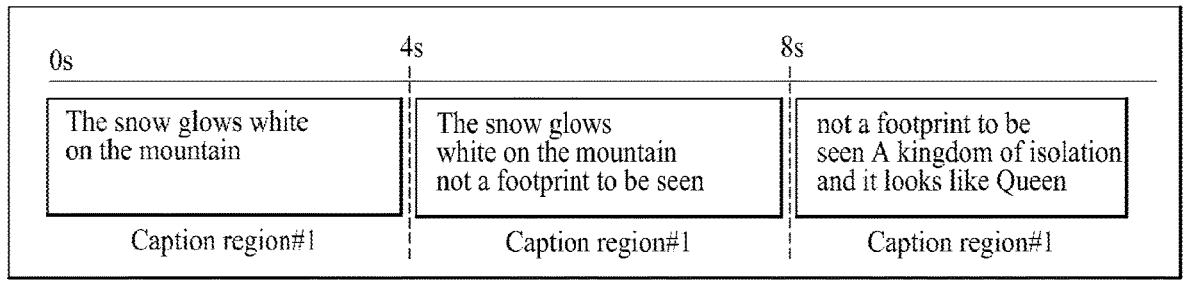
FIG. 17 is a diagram showing metadata for scrolling support of a caption according to an embodiment of the present invention.

FIG. 17 is a diagram showing metadata for scrolling support of a caption according to an embodiment of the present invention. Scrolling support information may provide a description of an intended scroll effect intended by a caption manufacturer. The scrolling support information may include information for a natural and smooth scrolling effect. Here, scrolling may refer to removal of a caption paragraph at a previous time point and display of a new caption paragraph. Metadata for scrolling support of a caption may specify a scroll direction and a scroll amount. Here, the scroll amount may use a cell or pixel unit. An upper part of the drawing shows a caption that is actually display on a caption region and a lower part of the drawing shows caption metadata. In the caption metadata, the scroll direction may be defined as bottom2top and the scroll amount may be defined as line 1. Accordingly, when a scroll of a caption is required, the caption may be scrolled from bottom to top in units of line 1. The caption metadata may specify that "The snow glows white on the mountain" between 00.00:00 and 00:00:08, "not a footprint to be seen" between 00:00:04 and 00:00:12, and "A kingdom of isolation and it looks like Queen" between 00:00:08 and 00:00:16 are displayed. Accordingly, as shown in an upper part of the drawing, in a caption region #1, paragraph "The snow glows white on the mountain" may be displayed between 0s and 4 s and "The snow glows white on the mountain" and "not a footprint to be seen" may be displayed between 4 s and 8 s. In addition, "not a footprint to be seen" and "A kingdom of isolation and it looks like Queen" may be displayed between 8 s and 12 s. In particular, a new paragraph "A kingdom of isolation and it looks like Queen" is added at 8 s and, thus, 1 line may be scrolled from bottom to top based on information on the scroll direction and the scroll amount. As a result, "The snow glows white on the mountain" that is a paragraph at a previous time point may be scrolled-out in a first caption region.

FIG. 18 is a diagram showing metadata for scrolling support of a caption according to an embodiment of the present invention. tts:scrollDirection may specify properties that define a scrolling direction of caption content in a caption region. A value thereof may be represented by <scrollDirection> and may have a value of "Top2Bottom", "Bottom2Top", "Left2Right", and "Right2Left". In the case of Top2Bottom, the caption scroll direction may be defined to bottom from top, in the case of Bottom2Top, the caption scroll direction may be defined to top from bottom, in the case of Left2Right, the caption scroll direction may be defined to right from left, and in the case of Right2Left, the caption scroll direction may be defined to left from right. tts:scrollDirection may be applied to an entire caption region.

tts:scrollType may specify properties that define a scrolling type of content in a caption region. A value thereof may be represented by <scrollType>, may specify whether a scroll unit is a line or a pixel, and may also specify the number of scroll units. That is, when scrollType is Line 1, this may represent that a scroll type is scrolled with 1 line on a line basis. tts:scrollType may be applied to an entire caption region.

tts:scrollSpeed may specify properties that define scrolling speed of content in a caption region. A value thereof may be represented by <scrollSpeed> and may represent the scroll speed in units of seconds to a first place of decimals. tts:scrollSpeed may be applied to an entire caption region.

A scroll direction and a scroll type may be defined together as <scrollDirection> and <scrollType> in tts:Scroll, respectively, as shown in a lower part of the drawing.

Figure 19:
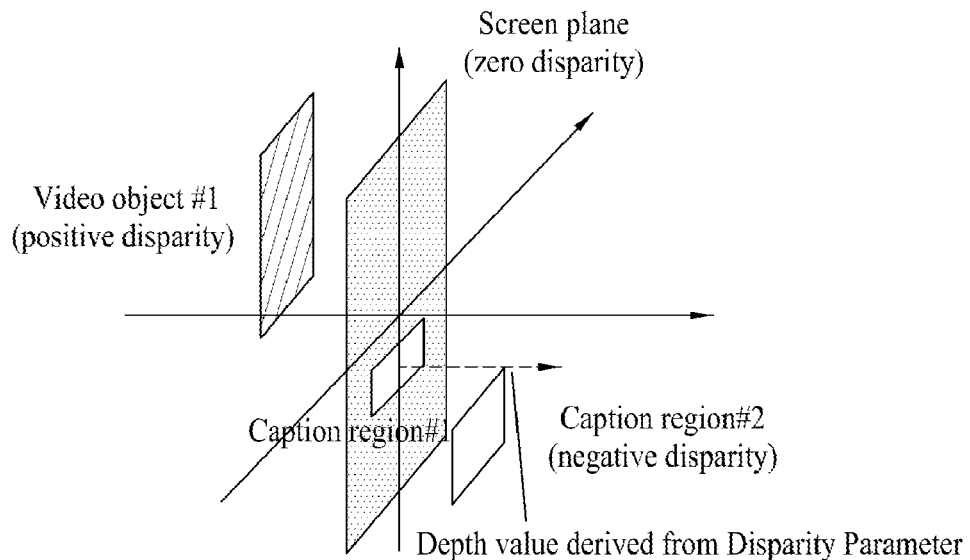
FIG. 19 shows 3D support information of a caption according to an embodiment of the present invention.

FIG. 19 shows 3D support information of a caption according to an embodiment of the present invention. The 3D support information of a caption may enable a caption manufacturer to accurately position a caption region on 3D video. Disparity information of a caption may be applied to 3D content. 3D support information included in caption metadata may specify a disparity value of a caption region. As shown in a left part of the drawing, when a disparity value is not defined, a caption region may be positioned on a zero disparity plane corresponding to a screen plane. However, when a disparity value of a caption region is specified in metadata, the caption region may be positioned and specified in a specific depth according to a depth value derived from a disparity parameter. In the case of a positive disparity value, a corresponding caption text plane may be positioned behind a screen plane and, on the other hand, in the case of a negative disparity value, the corresponding caption text plane may be positioned ahead of the screen plane.

Here, when a disparity value of a caption region is specified in a percentage format, disparity may be dependent upon width resolution of a displayed image. tts:disparity in metadata may specify a property that defines disparity information of a caption associated with an area generated by content flowed to a caption region. tts:disparity may be specified as ttm:disparity, ttp:disparity, etc. and may be defined as a value in a z-axis direction through tts:zIndexExt. As shown in the drawing, tts:disparity may have a value of <disparity>. <disparity> may be defined as a scalar value or a percentage value.

FIG. 20 is a diagram showing 3D support information of a caption according to another embodiment of the present invention. As described above, disparity information of a caption may also be signaled through tts:zIndexExt. As shown in a left part of the drawing, tts:zIndex attribute may be used to specify a property that defines disparity, that is, an offset value of a specific region. tts:zIndex attribute may have a value of the aforementioned <disparity> and may be applied to a region. A right part of the drawing shows an example in which tts:disparity is applied in caption information.

tts:disparity may be applied for each region. As shown in the drawing, tts:disparity with respect to a region of region id 1 may be set to 0 and tts:disparity with respect to a region of region id 2 may be set to −10%. Accordingly, with regard to a paragraph "I passed by his garden, and marked, with one eye, How the Owl and the Panther were sharing a pie." displayed in a region with region id 1, disparity 0 is applied to a corresponding region and, thus, the paragraph may be displayed as zero disparity. With regard to a paragraph "The Panther took pie-crust, and gravy, and meat. While the Owl had the dish as its share of the treat." displayed in a region with region id 2, disparity −10% is applied to a corresponding region and, thus, the paragraph may be displayed ahead of a screen plane by a value corresponding to 10% of horizontal resolution of an image.

FIG. 21 is a diagram showing presentation timing option information of a caption according to an embodiment of the present invention. Presentation time of a caption text in TTML may be adjusted, and presentation timing option information may be signaled for synchronization between other media and a caption in various viewing modes. The presentation timing option information may specify anchor point (time) of presentation time of a caption text. The caption text may be associated with the anchor point of the presentation time. Metadata in TTML may specify the anchor point of the presentation time in media time. In particular, time base in SMPTE-TT may be media. Here, "smpte" and "clock" of time base may not be used. A method of expressing time, <time expression> shown in an upper part of the drawing may be offset-time or clock-time. When offset-time is used, a metric may be (tick, t). A frame rate may be 30 fps unless otherwise defined.

When <time expression> uses clock-time or offset-time that does not use tick metric, presentation time M may be defined as follows.

$$M = referenceBegin + 3600*hours + 60*minutes + seconds + ((frames + (subFrames/subFrameRate))/effectiveFrameRate)$$

Here, referenceBegin may be determined according to whether the nearest ancestor time container uses a parallel (par) or sequential (seq) semantic. In the case of sequential semantic when a parallel or prior sibling timed element is not present, referenceBegin may be media time corresponding to a start part of the nearest ancestor time container. Alternatively, when the time container is Root Temporal Extent, referenceBegin may be 0. Otherwise, when a sequential and prior sibling timed element is present, referenceBegin may be media time corresponding to an active end of an immediate prior sibling timed element. Hours, minutes, seconds, frames, and subFrames components may be applied when corresponding values are present in <time expression> and, otherwise, the components may be set to 0. subFrameRate may be a calculated value of ttp:subFrameRate parameter and effectiveFrameRate (in frames per second) may be calculated according to frameRate* frameRateMultipler. frameRate may be a calculated value of ttp:frameRate parameter. frameRateMultipler may be a calculated value of ttp:frameRateMultiplier parameter.

According to another embodiment of the present invention, when <time expression> uses offset-time using tick metric, presentation time M may be defined as follows.

$$M = referenceBegin + ticks/tickRate$$

Here, referenceBegin is the same as in the above description and "ticks" is the same as a value specified in <time expression>. In addition, tickRate may be a calculated value of ttp:tickRate parameter.

FIG. 22 is a diagram showing presentation anchor time information of a caption according to an embodiment of the present invention. In previous drawings, referenceBegin may refer to presentation anchor time. Presentation anchor time may be signaled in TTML, ttp:presentationAnchorTime or ttm:presentationAnchorTime may include attribute that specifies start of presentation time of document instance. The presentation anchor time may be used in synchronization between a caption and other media data and may be used with the aforementioned presentation time offset to be used to calculate a display time of each caption text. A method of specifying presentation anchor time may be the aforementioned <time expression> method.

FIGS. 23 and 24 are diagrams showing a method of signaling presentation anchor time of a caption using ISOBMFF according to an embodiment of the present invention. In the above drawings, the presentation anchor time information is transmitted therewith in TTML, but, according to the present embodiment, the presentation anchor time information may be signaled in a specific box of ISOBMFF. In the drawing, composition_time_offset may specify presentation time offset of earliest presentation time of any sample in movie fragment or track. As shown in FIG. 23, composition_time_offset may be transmitted in a track header box (tkhd), a track extend box (trex), and a track fragment header box (tfhd). In addition, tf_flag of tfhd may be additionally defined and, in the case of 0x000004, this may indicate that composition_time_offset information of a corresponding track is present.

As shown in FIG. 24, composition_time_offset may also be transmitted in a segment index box (sidx) and a track run box (trun). In addition, tr_flag of trun may be additionally defined and, in the case of 0x000008, this may indicate that composition_time_offset information of a corresponding track is present.

FIG. 25 is a diagram showing scaling region information of a caption according to an embodiment of the present invention. The scaling region information may enable a caption manufacturer to define an extension degree of a caption region over a defined region. In other words, the scaling region information may implicitly specify a region in which a caption should not be positioned. That is, an extension degree of a caption region may be limited using the scaling region information to limit a degree by which a caption region partially overlaps with content. Information on scale limit of a caption region may be used to protect product placement advertisement (PPL). The scaling region information may specify a propriety that defines scaling factors allowed for a caption region. The scaling region information may specify an extension direction of a caption region and may specify an extension ratio associated with an original size. In the drawing, ttp:regionScaleDirection may define a scale direction of a caption region. Information on a scale direction of a caption region of ttp:regionScaleDirection may be defined using tts:regionScaleDirection or ttm:regionScaleDirection. A value of ttp:regionScaleDirection may be defined with re43spec to and, in detail, may have a value of "Top", "Bottom". "TopNBottom", "Left", "Right", "LeftNRight" or "All". That is, the caption region may be extension-scaled in an upward direction, a downward direction, an up and down direction, a left direction, a right direction, a right and left direction, or a forward direction.

ttp:regionScaleLimit may define scaling limit of a caption region. Information on scale limit of a caption region of ttp:regionScaleLimit may be defined using tts:regionScaleLimit or ttm:regionScaleLimit. A value of ttp:regionScaleLimit may be defined by <scale>. In detail, <scale> may have a scalar value or a percentage value, the scalar value may be represented by the number of units, and the percentage value may be represented by %. Here, a unit may have a value of a pixel, em, and c. Here, em may refer to a relative unit based on a size of a currently used text.

As shown in the drawing, information on scale direction and scale limit of a caption region may be defined together in <regionScale> and may be defined by <scaleDirection> and <scale>, respectively. Here, a value of ttp:regionScaleLimit may be interpreted in different ways according to a value of ttp:regionScaleDirection. For example, when ttp:regionScaleDirection is set to "Top", the caption region may be associated with a region height and may be extend upward.

FIG. 26 is a diagram showing play-out speed information and aspect ratio information of a caption according to an embodiment of the present invention.

Other than the aforementioned information, metadata of play-out speed of a caption may be signaled in TTML. The play-out speed information of the caption may be defined by ttp:playOutSpeed and, in some embodiments, may be defined by ttm:playOutSpeed or tts:playOutSpeed. The play-out speed information of the caption may define intended play-out speed with respect to a caption as the number of words per minutes in a caption region. The information may enable a reception apparatus to adjust caption output speed for users with slow read speed.

Metadata of an aspect ratio may be signaled in TTML. The aspect ratio information may be used to express an aspect ratio of a display that is targeted by a content manufacturer during content manufacture. The aspect ratio information of a caption may be defined by ttp:displayAspectRatio and, in some embodiments, may be defined by ttm:displayAspectRatio or tts:displayAspectRatio. The information may enable a reception apparatus to adjust a caption text region for different types of displays. The aspect ratio information may include horizontal and vertical information of a screen.

Metadata of an alternative aspect ratio may be signaled in TTML. Alternative aspect ratio information may be used to express an alternative aspect ratio of a display that is targeted by a content manufacturer during content manufacture. The alternative aspect ratio information of a caption may be defined by ttp:alternativeAspectRatio and may enable a reception apparatus to adjust a caption text region for different types of displays. The alternative aspect ratio information may include horizontal and vertical information of an alternative screen.

In the case of UHD, a root container region may be active video. Reference for tts:extent and tts:origin may be active video. In terms of UHD resolution, a format of the aforementioned caption related information may be a percentage format or a scalar format with <length> represented as c or em unit in tts:extent. Use of a scalar format with <length> represented in px unit in tts:extent may not be recommended. This is because, in a pixel-based case, only a portion of one word is frequently displayed. When a scalar format with <length> represented in px unit is used in tts:extent, the sum of tts:origin and tts:extent values may not exceed a width and height of resolution.

When an original target frame rate of a caption in UHD is different from a frame rate of video, start/end time of caption presentation may be mapped to media time. All video:audio presentation time may be mapped to media time. With regard to font size control, tts:overflow may be set to "visible", tts:wrapOption may be set to "wrap", ttp:regionScaleDirection may be set, and ttp:regionScaleType may be set, which may be recommended.

Figure 27:
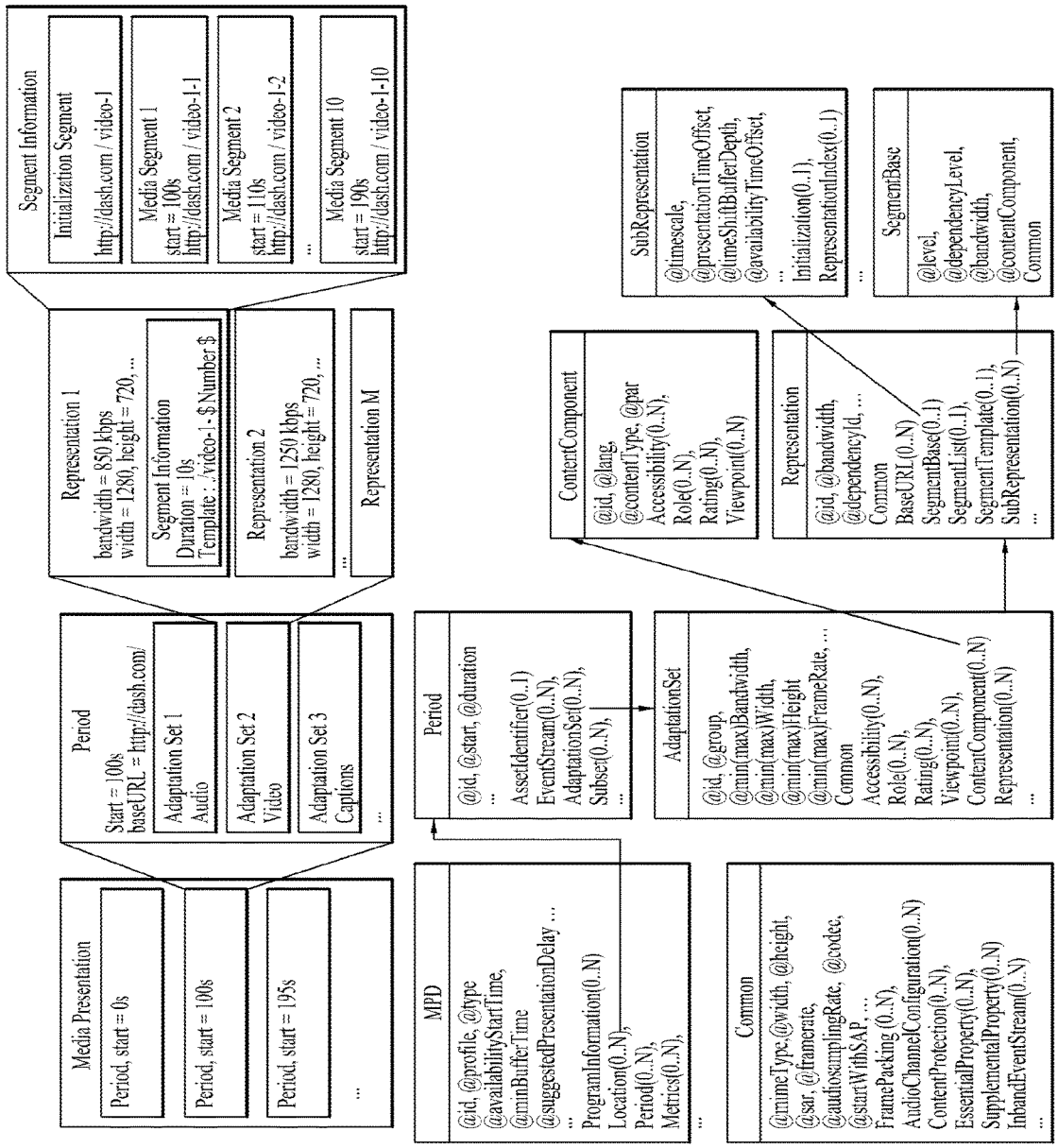
FIG. 27 is a diagram showing a dynamic adaptive streaming over HTTP (DASH) data model according to an embodiment of the present invention.

FIG. 27 is a diagram showing a dynamic adaptive streaming over HTTP (DASH) data model according to an embodiment of the present invention.

A transmission device according to an embodiment of the present invention may signal disparity information in MPEG DASH such that a DASH-based client provides a 3D video service. That is, the transmission device according to an embodiment of the present invention may signal display information of 3D video content. According to an embodiment of the present invention, signaling of disparity configuration information in a MPEG DASH may be applied to a DASH-based system. For example, signaling may be applied to ATSC 3.0, DVB IPTV, and DASG-based streaming systems, etc.

According to the DASH data model according to an embodiment of the present invention, MPD including information on media presentation may include information on one or more periods. One period may include information on one or more adaptation set. Information on one adaptation set may include information on one or more representations. Information on one representation may include information on one or more segments. Information on a segment may include information on an initialization segment and one or more media segments.

The embodiment shown in a lower drawing corresponds to a drawing for describing MPD in more detail.

The MPD may be represented by a relation of a Period element, an AdaptationSet element, a Representation element, a SubRepresentation element, a ContentComponent element, and/or a SegmentBase element. The MPD element may include @id, @profile, @type @availabilityStartTime, @minBufferTime @suggestedPresentationDelay, ProgramInformation(0..N), Location(0..N), Period(0..N), and/or Metrics(0..N). Here, the @profile and/or the @minBufferTime may be a mandatory field. The Period element may include @id, @start, @duration, AssetIdentifier(0..1), EventStream(0..N), AdaptationSet(0..N), and/or Subset (0..N). The AdaptationSet element may include @id, @group, @min(max)Bandwidth, @min(max)Width, @min(max)Height, @min(max)FrameRate, Common, Accessibility(0..N), Role(0..N), Rating(0..N), Viewpoint(0..N), ContentComponent(0..N), and/or Representation(0..N). The Representation element may include @id, @bandwidth, @dependencyId, Common, BaseURL(0..N), SegmentBase (0..1), SegmentList(0..1), SegmentTemplate(0..1), and/or SubRepresentation(0..N). Here, the @id and/or the @bandwidth may be a mandatory field. The SubRepresentation element may include @level, @dependencyLevel, @bandwidth, @contentComponent, and/or Common. The ContentComponent element may include @id, @lang, @contentType, @par, Accessibility(0..N), Role(0..N), Rating(0..N), and/or Viewpoint(0..N). Here, when @lang, @contentType, and/or @par are not present in AdaptationSet, these fields may or may not be defined in ContentComponent. The SegmentBase element may include @timescale, @presentationTimeOffset, @timeShiftBufferDepth, @availabilityTimeOffset, Initialization(0.. 1), and/or RepresentationIndex (0.. 1). The DASH data model according to an embodiment of the present invention may include a Common attribute and element. The Common attribute and element may include @mimeType, @width, @height, @sar, @framerate, @audiosamplingRate, @codec, @startWithSAP, FramePacking (0..N), AudioChannelConfiguration(0..N), ContentProtection(0..N), EssentialProperty(0..N), SupplementalProperty(0..N), and/or InbandEventStream(0..N). The aforementioned Common attribute and element may be applied in AdaptationSet, Representation, and/or SubRepresentation.

In the drawing and the above description, a field with @ attached to a front portion of a name thereof may indicate an attribute and a field without @ may indicate an element. (0..N) subsequent to a name of an element may indicate that a minimum value of 0 and a maximum value of N of corresponding elements are present. Here, N may indicate that there is no limitation. According to an embodiment of the present invention, description of element or attribute in MPD may comply with definition in the DASH standard. The MPD may be description of media presentation in order to provide a streaming service. Period may indicate an interval of media presentation. Sequential sequences of all periods may be included in a media presentation. Segment may indicate a unit of data associated with the URL described by the MPD and a byte range. Adaptation Set may indicate a set of exchangeable encoded versions of one or more media content components. Representation may refer to combination and encapsulation of one or more media streams in a transfer format. Sub-Representation may indicate a portion of the Representation described by the MPD.

Hereinafter, the present invention proposes a caption (closed caption/subtitle) related signaling method during a streaming service based on the aforementioned MPEG dynamic adaptive streaming over HTTP (hereinafter, DASH) or the like. In particular, a method of signaling 3D support, scrolling, presentation timing offset, and scaling factors of caption (closed caption/subtitle) on MPD will be described.

FIG. 28 is a diagram showing a method of specifying caption information in MPD according to an embodiment of the present invention. The present invention proposes a signaling method for providing closed caption during a streaming service based on MPEG dynamic adaptive streaming over HTTP (hereinafter, DASH). When a broadcast service is transmitted through DASH, etc. or streamed via the Internet, caption (closed caption/subtitle) related information or the like may be signaled through SupplementalProperty descriptor or EssentialProperty descriptor, which is as shown in the drawing, in DASH Media Presentation Description (hereinafter, MPD). In some embodiments, the caption related information may be expressed in other descriptors or elements. The descriptor or the element may be included in AdaptationSet, Representation, SubRepresentation, etc. of MPD as low-level information. The descriptor may include @schemeIdUri, @ value, and @id information.

FIG. 29 is a diagram showing a descriptor for specifying caption information in MPD according to an embodiment of the present invention. Closed caption/subtitle related information may be signaled through MPD in the illustrated format. The caption related information descriptor may include, ischmeIdUri indicating caption related information and, for example, may be set like urn:mpeg:dash:closed-caption:201x. This may indicate a scheme ID for a closed caption/subtitle configuration scheme. @value may include language, accessibility, aspect_ratio, alternative_aspect_ratio, scaling_support, scrolling_support, Playout_speed, extended_color_use, 3D_support, and/or 3D_disparity information. The language information may indicate language information of a closed caption/subtitle. This may be represented by language code per ISO 639.2/B or the like. This may include one or more language codes. The accessibility information may indicate a target user, etc. of the closed caption/subtitle or the like and, in detail, may indicate 0: normal, 1: easy reader, 2: visually impaired, and 3: hearing impaired. The aspect_ratio information may indicate an aspect ratio intended by a closed caption/subtitle author. For example, this may be represented by 4:3, 16:9, 21:9, or the like. The alternative_aspect_ratio information may indicate a compatible aspect ratio of the closed caption/subtitle. This may be represented by 4:3, 16:9, 21:9, or the like. The scaling_support information may indicate whether an original closed caption/subtitle region of the closed caption/subtitle is extensible as necessary during presentation on a receiver. Alternatively, the information may indicate whether a detailed parameter according to extension is included in the closed caption/subtitle or the like. When a corresponding region is extensible during presentation on a receiver, corresponding information may be set to ' '. The scrolling_support information may indicate whether the closed caption/subtitle is capable of being scrolled on a closed caption/subtitle region or a detailed parameter based thereon is included in the closed caption/subtitle. When scrolling is possible, the corresponding information may be set to '1'. The Playout_speed information may indicate play-output speed in an original closed caption/subtitle region when the closed caption/subtitle is presented on the receiver. The extended_color_use information may indicate whether the closed caption/subtitle uses a color value configured with 8 bits or more. The 3D_support information may indicate whether the closed caption/subtitle supports 3D. When 3D is supported, a value of the corresponding information may be set to '1'. The 3D_disparity information may indicate a 3D location of the front-most closed caption/subtitle of a caption based on a screen when the closed caption/subtitle supports 3D. That is, the information may indicate a front-most value (minimum disparity) of disparity of a plurality of closed caption regions in video. When the information has a negative value, the information may indicate a degree of a forward protrusion effect based on a screen and, when the information has a positive value, this may be used in an opposite way.

FIG. 30 is a diagram showing caption related information included in MPD according to an embodiment of the present invention. Through the aforementioned method, signaling related to a caption on DASH MPD may be specified as shown in the drawing. As shown in the drawing, the caption related information may be specified as SupplementalProperty defined as schemeIdUri="mpeg:dash:closed-caption: 201x" and may be specified in AdaptationSet in the drawing but, in some embodiments, the information may be included in Representation, SubRepresentation, or the like.

FIG. 31 is a diagram showing detailed information of caption related information according to an embodiment of the present invention. When the closed caption/subtitle supports scrolling or the like, MPD may signal a detailed parameter or the like in a format shown in an upper part of the drawing. A scrolling related detailed parameter may include @schmeIdUri and, for example, may be set like urn:mpeg:dash:closed-caption-scroll:201x. This may indicate a scheme ID for a closed caption/subtitle scrolling configuration scheme. @value may include Scrolling_direction, scrolling_type, scrolling_amount, and/or scrolling_speed information. The Scrolling_direction information may indicate information on a direction in which a closed caption/subtitle region of the closed caption/subtitle is scrolled on a receiver. In detail, the corresponding information may have a value of "Top2Bottom", "Bottom2Top", "Left2Right", "Right2Left", and the like. This has been as described above. The scrolling_type information may indicate a proceeding type of scrolling, etc. when the closed caption/subtitle region of the closed caption/subtitle supports scrolling on a receiver. For example, this may indicate whether scrolling is performed in units of lines (or cells) or is performed in units of pixels. The scrolling_amount information may indicate a scrolling degree, etc. when the closed caption/subtitle information of the closed caption/subtitle supports scrolling on a receiver. This may be represented by a cell number, a pixel number, or the like. The scrolling_speed information may indicate scrolling speed, etc. when an original closed caption/subtitle region of the closed caption/subtitle supports scrolling on a receiver. This may be represented in units of seconds (if necessary, this may be represented down to decimal places).

MPD may signal a detailed parameter, etc. in the illustrated format when an original closed caption/subtitle region of the closed caption/subtitle is extensible as necessary during presentation on a receiver. The scaling related detailed parameter may include @schmeIdUri and, for example, may be set like urn:mpeg:dash:closed-caption-scale:201x. This may indicate a scheme ID for a closed caption/subtitle scaling configuration scheme. @value may include scale_direction and/or scale_limit information. The scale_direction information may indicate information on a direction in which a closed caption/subtitle region of a closed caption/subtitle is extensible. In detail, the corresponding information may have a value of "Top", "Bottom", "TopNBottom", "Left", "Right", "LeftNRight", "All", or the like. This has been as described above. The scale_limit information may indicate an extension limit degree or the like when the closed caption/subtitle region of the closed caption/subtitle is extensible. This may be represented by a cell number, a pixel number, or the like or may be represented by a percentage degree or the like. This has been as described above.

FIG. 32 is a diagram showing detailed information of caption related information according to an embodiment of the present invention. MPD may signal presentation anchor time of presentation timing included in the closed caption/subtitle, as shown in the drawing. Furthermore, the MPD may indicate presentation anchor time of a video/audio component or the like. An anchor time related detailed parameter may include @schmeIdUri and, for example, may be set like urn:mpeg:dash:anchor_presentation:201x. This may indicate a scheme ID for presentation anchor time for media essence including the closed caption/subtitle. @value may include Time_format and/or Time_value information. The Time_format information may indicate format information of presentation anchor time. This may have a value of UTC, clock, offset, PTP, etc. In addition, the Time_value information may include a presentation anchor time value. This may be represented in different forms according to the time_format. For example, when the time_format is clock, this may be represented in the form of hour: minute: second (seconds or frames of decimal places). This may be represented in the form of hours ":" minutes":" seconds (fraction | ":" frames ("." sub-frames)). According to another embodiment of the present invention, when the time_format is offset, this may be represented in the form of a tick number based on tick_rate: tick_rate.

MPD may signal offset of presentation timing included in the closed caption/subtitle in the form shown in a lower part of the drawing. Furthermore, the MPD may indicate presentation offset of a video/audio component or the like. A presentation timing offset related detailed parameter may include @schmeIdUri and, for example, may be set like urn:mpeg:dash:presentation_offset:201x. This may indicate a scheme ID for presentation offset of media essence including the closed caption/subtitle. The @value may include Time_format and/or Time_value information. The Time_format information may indicate format information of presentation timing offset. This may have a value of clock, offset, or the like. The Time_value information may include a presentation timing offset value. This may be represented in different formats according to the time_format. For example, when the time_format is clock, this may be represented in the form of hour: minute: second (seconds or frames of decimal places). This may be represented in the form of hours":" minutes":" seconds (fraction |":" frames ("." sub-frames)). According to another embodiment of the present invention, when the time_format is offset, this may be represented in the form of a tick number based on tick_rate:tick_rate. When the closed caption/subtitle is based on a timed text, the caption information may include information on presentation start and end of the closed caption. A receiver may adjust presentation timing included in the closed caption/subtitle based on the above signaling information.

Figure 33:
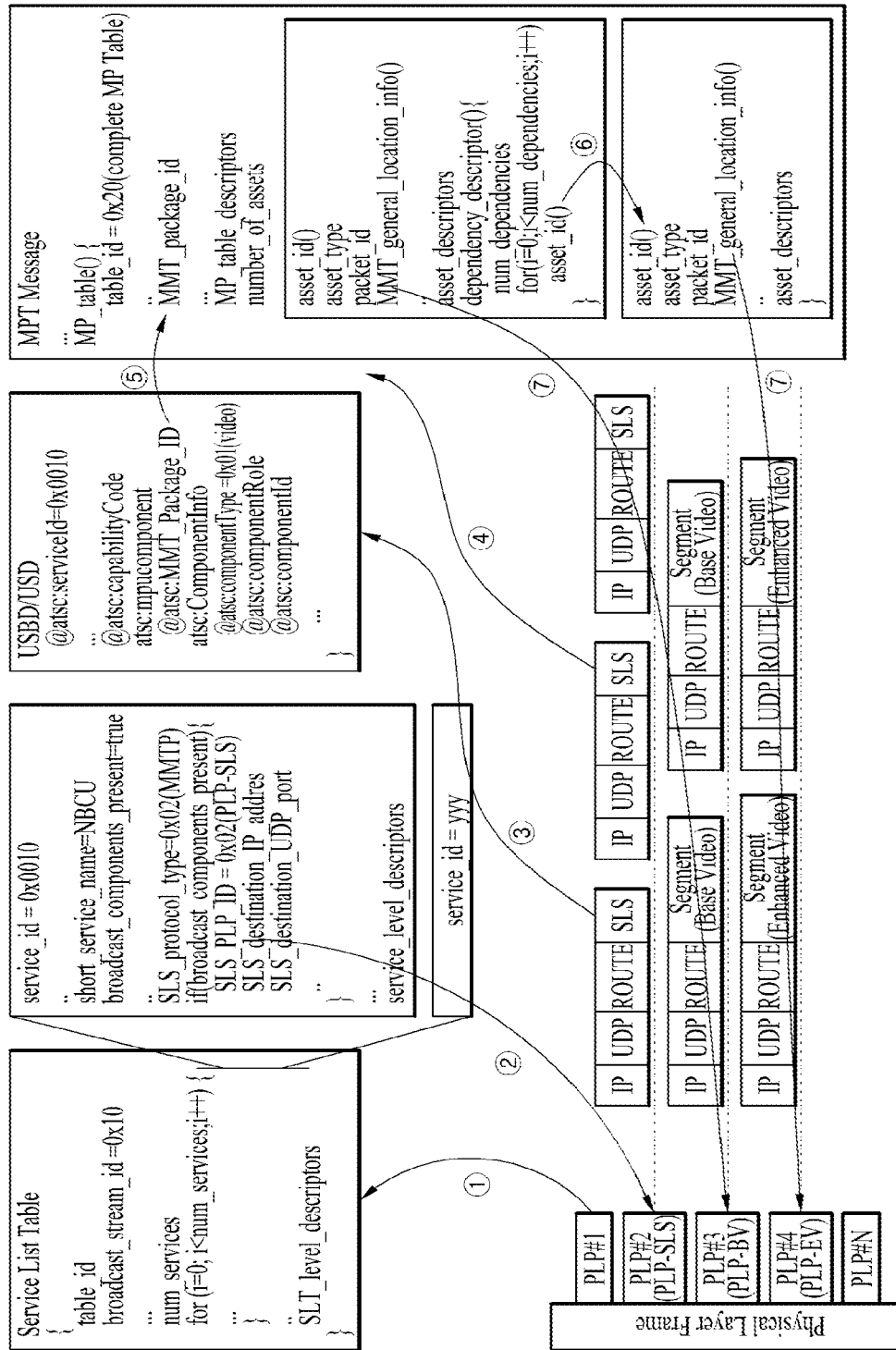
FIG. 33 is a diagram illustrating MMT protocol based signaling flow according to an embodiment of the present invention.

FIG. 33 is a diagram illustrating MMT protocol based signaling flow according to an embodiment of the present invention.

First, a process of acquiring an SLT and acquiring an SLS using the SLT may be identical. In the case of MMT based signaling, the SLS may include a USBD and/or MMTP messages. Information on an MMT package associated with the service may be acquired from the USBD. Using this information, an MPT (MP table) message may be acquired from a service signaling channel. The service components of the service may be acquired through the MPT message. In the illustrated embodiment, information on an asset for a base layer of scalable coding content and/or information on an asset for an enhancement layer may be acquired. In addition, a path (transport session, etc.) capable of acquiring each asset may be acquired. Here, the asset may correspond to the service component of the service. MPUs may be acquired, decoded and played back through the path. The detailed bootstrapping process has been described above.

In some embodiments, MMPT messages other than the MPT message may be defined. Additional information items of the service may be delivered through these messages. For example, scalable coding related information, 3D related information, HDR related information, color gamut related information, additional information of service components, etc. may be delivered through these messages. In some embodiments, an MPD for service components delivered over broadband, a table for app signaling and event information may also be delivered through these messages.

Figure 34:
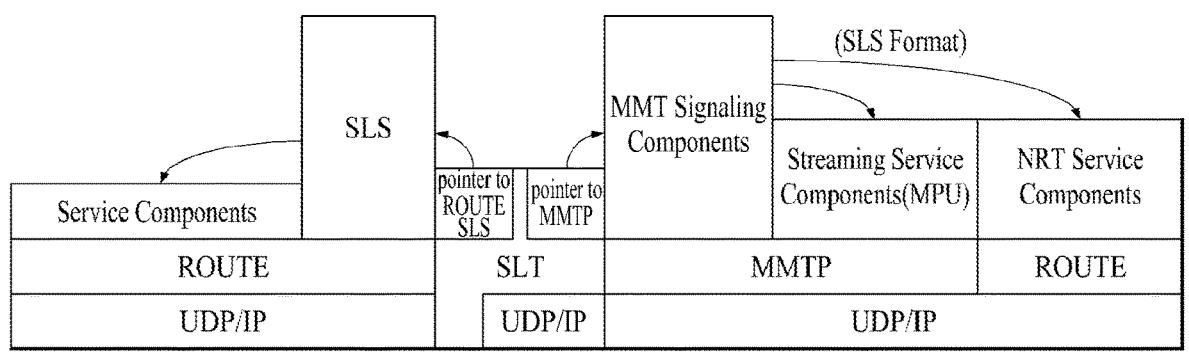
FIG. 34 is a diagram illustrating a bootstrapping process through an SLT according to an embodiment of the present invention.

FIG. 34 is a diagram illustrating a bootstrapping process through an SLT according to an embodiment of the present invention.

As described above, SLS bootstrapping may be performed through bootstrap information of an SLT. As described above, the SLT may be processed into IP/UDP and transmitted or may be transmitted without being processed into IP/UDP. In general, low level signaling (LLS) such as SLT may be delivered by a most robust method in transmission.

If the SLS is transmitted by the ROUTE protocol, the receiver may access the SLS through the bootstrap information of the SLT. Using the information of the ROUTE SLS, the service components of the service may be acquired. Here, the SLS and the service components may be transmitted by the ROUTE, UDP and IP protocols.

If the SLS is transmitted by the MMT protocol, the receiver may access the SLS through the bootstrap information of the SLT. Using the information of the MMTP SLS, the service components of the service may be acquired. The MMTP SLS may include a USBD and/or MMTP message. As described above, the USBD may reference to the MMTP message and the MPT message of the MMTP message may provide information items for acquiring streaming components delivered by the MMT protocol. The USBD of the MMT may further reference an S-TSID for acquiring the NRT components of the service delivered by the ROUTE protocol. In addition to the above-described MPT message, other MMTP messages for providing other information items may be defined. Here, the SLS and the service components may be transmitted by the MMT, UDP and IP protocols. Here, the NRT components may be transmitted by the ROUTE, UDP and IP protocols. The detailed bootstrapping method has been as described above.

FIG. 35 is a diagram showing a portion of USBD according to another embodiment of the present invention. Like a user service description (USD) for ROUTE, MMT, 3GPP, or the like, service signaling information including information on a service may signal service level information, as shown in the drawing. Syntax thereof is the same as in the drawing. The element or attributes may be included in MMT signaling information (e.g., MP Table) or a portion of 3GPP service signaling or ROUTE signaling. Details of the information items have been as described with reference to FIGS. 4 and 5.

FIG. 36 is a diagram showing a portion of USBD according to another embodiment of the present invention. The present invention proposes a method of signaling capability information of a broadcast service and service components included in the service. The present invention proposes a method of signaling video/audio/closed caption information of a service/service component. The present invention proposes a method of signaling information on SMPTE-TT or CEA-809 based closed caption of a service/service component. In some embodiments, the aforementioned information items may be transmitted in SLT or other service signaling information. In some embodiments, the information items may be transmitted in USBD according to ROUTE or MMT. In some embodiments, the information items may be defined as one of ROUTE SLS and may be transmitted with other SLS or may be defined as one of MMTP SLS and may be transmitted in one of the aforementioned MMTP messages. In some embodiments, the information items may be transmitted in MPD and, in this case, may be transmitted in the aforementioned EssentialProperty and/or SupplementalProperty. In some embodiments, the information items may be included in the aforementioned MPT message of MMTP messages or may be transmitted in one of separately defined MMTP messages. In some embodiments, the information items may be defined by various descriptors in an XML or binary form or may be configured with an element and may be transmitted in signaling information according to ROUTE, MMT, 3GPP, or the like. The information items will be described below in detail.

In some embodiments, the aforementioned USBD of ROUTE or MMT may include a ComponentInfo element. The ComponentInfo element has been as described above. In some embodiments, the ComponentInfo element may be extended to further include the illustrated fields.

In the illustrated embodiment, the ComponentInfo element may further include @componentType, @componentRole, @acomponentGroupId, @essentialIndicator, @dependentComponentID, @protocolType, @rt, @targetDevice, @componentCodec, @componentProfile, @componentLang, @width, @height, Accessibility, Capability, Rating, Targeting, ComponentDescription, and/or ComponentProperty. In some embodiments, only some of the added fields may be added to the ComponentInfo element.

The @componentType may indicate a component type and, when corresponding attribute is set to 2, this may indicate a caption component.

The @componentRole may be attributes indicating a type or role of a component. With regard to the present invention, the @componentRole may indicate that video including a caption as a component is included in a corresponding component. In this case, the (componentRole may be set to 11. The @componentRole may be used for a caption component. When the aforementioned @componentType has a value of 2, @componentRole with 0 may indicate main, @componentRole with 1 may indicate alternate, @componentRole with 2 may indicate supplementary, (componentRole with 3 may indicate Normal, (componentRole with 4 may indicate Easy reader, and (d componentRole with 5 may indicate textual description (a textual description describing video component).

The @componentGroupId may be an identifier of a component group. Here, the component group may be collection of components. Components included in a component group may indicate the same scene or may be components that are combined to generate presentation. For example, service components including music, dialog, and sound effects that are used to provide completed audio may be grouped as one component group. Service components including left and right images of a 3D image may be grouped as one component group.

The @essentialIndicator may indicate whether a corresponding component is an essential component for a corresponding service. When this field is 1, the corresponding component may be an essential component for a corresponding service. The @dependentComponentID may indicate identifier(s) of dependent component(s). For example, with regard to an enhanced video component, this field may indicate identifier(s) of base video component(s).

The (protocolType may indicate a transport protocol for transmitting a corresponding component. For example, this field may indicate an ROUTE or MMT protocol. @rt may indicate whether a corresponding component is a real time component.

The @targetDevice may indicate a target device targeted by a corresponding component. For example, when a value of this field is 0, 1, 2, and 3, corresponding components may indicate a primary device, a companion device, primary & companion devices, and a component for inset on a primary screen, respectively.

The @componentCodec may provide codec information for a corresponding component. The @componentProfile may indicate a profile of a corresponding component. The @componentLang may indicate a language used in a corresponding component. This field may be used, in particular, audio and closed caption component. The @width may indicate a horizontal size of video media presentation transmitted by a corresponding video component. The @height may indicate a vertical height of video media presentation transmitted by a corresponding video component.

Accessibility may provide accessibility related information of a corresponding component. Capability may provide capability related information of a corresponding component. Rating may provide rating related information of a corresponding component. Targeting may provide targeting or personalization related information of a corresponding component. The ComponentDescription may provide component description information of a corresponding component. The information may include codec dependent encoding parameters. The ComponentProperty may provide component attributes for processing a corresponding component.

The aforementioned (componentType field in the ComponentInfo element may indicate a type of a corresponding component and, in this regard, when the field has a value of 0, 1, 2, and 3, corresponding components may indicate audio, video, caption, and application components, respectively.

The a componentRole field may indicate a role of a corresponding component. The role may be indicated according to an indicated component type and, in the case of an audio component, when the field has a value of 1, 2, 3, 4, 5, 6, and 7, a corresponding audio component may perform roles of complete main, music, effect, dialog, commentary, visually impaired, hearing impaired, voice over, and subset. Here, the visually/hearing impaired may mean that a corresponding audio component is an audio component for visually/hearing impaired people. The voice over may mean that a corresponding audio component describes a video component.

In the case of a video component, according to a value of the field, a corresponding video component may perform a role of primary video, alternate camera view, sign language, a 3D left image, a 3D right image, 3D video depth information, caption containing video, or the like. In the case of a caption component, according to a value of the field, a corresponding caption component may perform a role of main, alternate, supplementary, normal, easy reader, and the like.

In some embodiments, the remaining part of USBD of the aforementioned ROUTE or MMT may be modified. The modifications may be combined according to the number of cases.

In some embodiments, the USBD may further include @providerId, (serviceCategory, @spIndicator, @serviceStatus, @shortServiceName, and/or capabilityCode.

The @providerid may identify a service provider of a corresponding service. The @serviceCategory may indicate a category of a corresponding service. The @spIndicator may be the same as the aforementioned @protected attribute. The @serviceStatus may be the same as the aforementioned @servicestatus attribute. The @shortServiceName may indicate a short name of a corresponding service. The capabilityCode may indicate capability and capability group required to provide meaningful media presentation of a corresponding service by a receiver.

In some embodiments, the USBD may further include @majorChannelNo. @minorChannelNo, and/or @serviceLang as well as the aforementioned Channel element.

The @majorChannelNo and the a@minorChannelNo may indicate a major/minor channel number of a corresponding service. The @serviceLang may indicate a primary language of a corresponding service.

In some embodiments, the USBD may further include a dashComponent element instead of the aforementioned routeComponent and broadbandComponent. The dashComponent element may include @fullMPDUri, @sTSIDUri, and/or deliveryMethod elements.

The @fullMPDUri may provide reference information of MPD for service components transmitted through a broadcast network or a broadband. The @sTSIDUri may provide a transport session related information of a service component of a corresponding service. The deliveryMethod may provide transport related information items of service components of a corresponding service. As described above, the field may further include an element of each of components transmitted through a broadcast network/broadband and/or basePattern information thereof.

FIG. 37 is a diagram showing caption information according to an embodiment of the present invention. When a corresponding service component is a closed caption stream component, the caption information may include caption description information related to the closed caption stream component. The caption information may have one form of descriptors according to the aforementioned embodiments or may have a form of an element. This may be represented by the aforementioned componentProperty element, etc. In the illustrated embodiment, the caption information may be defined in the form of a descriptor. The @schemeIdUri may be URI for identifying that a corresponding descriptor has a caption scheme of caption information. In this case, the @schemeIdUri may have a value of urn:atsc3.0:caption:201x. The @value may have values, the meaning of which is defined according to a caption scheme. The values will be described below. The @id may indicate an identifier of a corresponding descriptor. In the case of the same identifier, the field may include the same scheme ID, value, and parameter.

The embodiment illustrated in an upper art of the drawing may indicate the aforementioned parameters of the @value. The caption_codec may indicate an encoding type of a corresponding caption component. In some embodiments, the field may indicate "CEA-608", "CEA-708", "SMPTE-TT", or the like. The lang may include language information of a corresponding caption component. The caption_service_number may include a service number of a corresponding caption when a type of a corresponding caption component is CEA-708. The easy_reader flag may be a flag indicating whether a corresponding caption component is an easy reader. The aspect_ratio may indicate a display aspect ratio of a corresponding caption component. In some embodiments, the field may indicate "4:3", "16:9", or the like. The 3D supported may indicate whether a corresponding caption component supports 3D. In some embodiments, the caption information may define each of parameters of the aforementioned @value in the form of a caption element with a sub field.

For example, when a closed caption stream component includes an English caption based on SMPTE-TT, the component may be signaled as shown in a lower-left part of the drawing. With regard to a component info element in USBD/USD, @icomponentType is set to a value of 0x03, (componentRole is set to main, and the component info element includes a caption related component. The component info element may include a component description element of a corresponding component. Here, the component description element may have a scheme ID of "urn:atsc3.0:caption:201x" and @value may have a value of "SMPTE-TT, ENG., false, 4:3, false", as shown in a lower-right part of the drawing. Parameters of the @value may sequentially have the meanings according to the aforementioned definition of the parameters.

In addition, when closed caption data based on CEA-708, etc. is included in a bitstream of an HEVC video stream component, closed caption related information items with the aforementioned HEVC video data related information items may be signaled using the aforementioned method.

FIG. 38 is a diagram showing caption information according to another embodiment of the present invention. When a corresponding service component is a closed caption stream component, the caption information may include caption description information related thereto. The caption information may have one of forms of the descriptors according to the aforementioned embodiments or may have a form of an element. The information may be represented by the aforementioned componentProperty element or the like. Furthermore, when Representation/AdaptationSet, etc. include a closed caption/subtitle in DASH, the information may include the following form as an Essential Property Descriptor, a supplemental Property Descriptor, or the like of DASH MPD. In the illustrated embodiment, caption information may be defined in the form of a descriptor. The (schemeIdUri may be a URI for identifying that a corresponding descriptor has a caption scheme related to caption information. In this case, the <ischemeIdUri may have a value of urn:atsc3.0:caption:201x. The @value may have values, the meaning of which is defined according to a caption scheme. The values will be described below. The illustrated embodiment may indicate each of parameters of the aforementioned @value. The caption_codec may indicate an encoding type of a corresponding caption component. In some embodiments, the field may indicate "CEA-608", "CEA-708", "SMPTE-TT", or the like. The lang may include language information of a corresponding caption component. The caption_service_number may include a service number of a corresponding caption when a type of a corresponding caption component is CEA-70. The accessibility may indicate a target user, etc. of a closed caption/subtitle included in a corresponding caption component and information thereof may have the following values. In detail, the information may indicate 0: normal, 1: easy reader, 2: visually impaired, and 3: hearing impaired. The aspect_ratio may indicate a display aspect ratio of a corresponding caption component. In some embodiments, the field may indicate "4:3", "16:9", "21:9", and the like. The alternative_aspect_ratio may indicate a compatible display aspect ratio of a corresponding caption component. In some embodiments, the field may indicate "4:3", "16:9", "21:9", and the like. The scaling_support may indicate whether an original closed caption/subtitle region of the closed caption/subtitle is extensible as necessary during presentation on a receiver. Alternatively, the field may indicate whether the closed caption/subtitle, etc. include a detailed parameter according to extension. When a corresponding region is extensible during presentation on a receiver, the field may have '1'. The scrolling_support may indicate whether scrolling of an original closed caption/subtitle region of the closed caption/subtitle is supported on a receiver. Alternatively, the field may indicate whether a detailed parameter according to thereto is included in a closed caption/subtitle. When scrolling is enabled, corresponding information may have '1'. The playout_speed may indicate play-out speed of an original closed caption/subtitle region of the closed caption/subtitle during presentation on a receiver. The extended_color_use may indicate whether the closed caption/subtitle uses a color value configured with 8 bits or more. The 3D supported may indicate whether a corresponding caption component supports 3D. The 3D_disparity may indicate a 3D location of the front-most closed caption/subtitle of a caption based on a screen when the closed caption/subtitle supports 3D. When the 3D_disparity has a negative value, the information may indicate a degree of a forward protrusion effect based on a screen and, when the 3D_disparity has a positive value, this may be used in an opposite way. The information may explicitly indicate a front-most value (minimum disparity) of disparity of a plurality of closed caption regions in video. In some embodiments, the caption information may be defined in the form of a caption element having each of parameters of the aforementioned @value as a sub field.

FIG. 39 is a diagram showing caption information according to another embodiment of the present invention. The caption information may include related caption description information when a corresponding service component is a closed caption stream component. The caption information may have one of forms of the descriptors according to the aforementioned embodiments or may have a form of an element. The information may be represented by the aforementioned componentProperty element or the like. Furthermore, when Representation/AdaptationSet or the like includes a closed caption/subtitle in DASH, the information may include the following form as Essential Property Descriptor, supplemental Property Descriptor, or the like of DASH MPD. In the illustrated embodiment, only additionally included information compared with FIG. 38 will be described below. Other information items have been as described above. In the illustrated embodiment, the caption information may be defined in the form of a descriptor. The (schemeIdUri may be a URI for identifying that a corresponding descriptor has a caption scheme related to caption information. In this case, the @schemeIdUri may have a value of urn:atsc3.0:caption:201x. The @value may have values, the meaning of which is defined according to a caption scheme. The added @values is now described. The Profile may indicate a form indicating a closed caption using an XML-based Timed text or the like. For example, the field may indicate TTML, IMSC, EBU-TT-D, or the like. The profile_version may indicate version information of a form indicated by the aforementioned profile. That is, when the profile indicates TTML, the field may indicate TTML1 or TTML2 and when the profile uses IMSC, the field may indicate IMSC1, IMSC2, or the like. The sub-profile may indicate a detailed profile in a form indicated by the aforementioned profile. For example, in the case of IMSC, the field may indicate an image-only profile, a text-only profile, or the like. That is, the field may indicate whether a caption/subtitle includes only an image and includes only a text, and, furthermore, whether an image and a text are mixed. The WCG support may indicate whether a closed caption/subtitle uses wide color gamut. The Color_gamut may indicate information on color gamut used by the closed caption/subtitle. The field may include a color gamut type (BT 709, BT2020, etc.) and, furthermore, may include a CIExy coordinate value of red, green, blue, and white points. The HDR_support may indicate whether a closed caption/subtitle includes HDR content. The HDR may include an identifier indicating a combination of HDR related parameters used by the closed caption/subtitle. In some embodiments, the HDR may have the following values. In the case of 0, non-specified may be indicated. In the case of 1, this may indicate that EOTF: SMPTE ST2084, bit depth: 12 bit/pixel, peak luminance: 10000nit, codec: HEVC dual codec (HEVC+HEVC), and metadata uses SMPTE ST 2086 and SMPTE ST 2094. In the case of 2, this may indicate that EOTF: SMPTE ST2084, bit depth: 10 bit/pixel, peak luminance: 4000nit, codec: HEVC single codec, and metadata uses SMPTE ST 2086 and SMPTE ST 2094. In the case of 3, this may indicate that EOTF: BBC EOTF, bit depth: 10 bit/pixel, peak luminance: 1000 nit, and codec: HEVC single codec. In the case of 4-255, this may indicate reserved for future use. Accordingly, the HDR may include values indicating OETF_type, max_mastering_display_luminance, min_mastering_display_luminance, average_frame_luminance_level, max_frame_pixel_luminance, and the like.

FIG. 40 is a diagram showing an MMT message format according to an embodiment of the present invention. The aforementioned Component Description or Component property element may be represented as Essential Property Descriptor, supplemental Property Descriptor, or the like of DASH MPD and may be transmitted in MPD. According to another embodiment of the present invention, a descriptor and the like proposed by the present invention may be transmitted in a message payload, etc. of the illustrated mmt_atsc3_message. The mmt_atsc3_message may include the following information. The message_id may indicate an identifier for uniquely identifying the mmt_atsc3_message. The Version may indicate a version of a corresponding message as the version is increased by 1 whenever information of the message is changed. The Length may indicate a length of the mmt_atsc3 message in units of bytes. The service_id may be an identifier for identifying a service included in a payload of the mmt_atsc3_message. The atsc3_message_content_type may be an identifier for identifying time of message content included in a payload of the mmt_atsc3_message. The atsc3_message_content_version may be version information indicating whether information in the atsc3_message content is changed. The atsc3_message_content_compression may indicate a type of compression applied to data included in the atsc3_message. The URI_length may indicate a length of a URI for identifying a service relation with a message payload. The URI_byte may indicate a URI related to content delivered by a corresponding message. The atsc3_message_ content_ length may indicate a length of content delivered by a corresponding message. The atsc3_message_content_byte may indicate a byte of content delivered by a corresponding message.

FIG. 41 is a diagram showing a device capabilities information (DCI) table as a signaling table according to an embodiment of the present invention. MMT signaling may include a DCI table as a signaling table for providing information on device capabilities required for component consumption of a broadcast service. The DCI table may include table_id, version, length, number of_assets, asset_id( ), mime_type( ), and codec_complexity_flag information. The DCI table may further include information such as video_average_bitrate, video_maximum_bitrate, horizontal_resolution, vertical_resolution, temporal_resolution, and video_minimum_buffer_size of video_codec_complexity when codec_complexity_flag is set to 1 and top level mime_type( ) of each asset is video. The DCI table may further include information such as audio_average_bitrate, audio_maximum_bitrte, and audio_minimum_buffer_size of audio_codec_complexity when codec_complexity_flag is set to 1 and top level mime_type( ) of each asset is audio. The DCI table may further include required_storage information of download_capability when codec_complexity_flag is set to 0. The DCI table may further include asset_descriptors and may further include num_asset_descriptors information therein. The DCI table may further include asset_descriptors corresponding to num_asset_descriptors and may further include asset_descriptors_byte information including content of each of asset_descriptors.

The table_id information may indicate an identifier of a DCI table. The version information may indicate version information of a DCI table. The length information may indicate length information of fields subsequent to a corresponding field. The number_of_assets information may indicate the number of assets, which is specified by a DCI table. The asset_id( ) may indicate an identifier of each asset and the mime_type( ) information may indicate mime time of each asset. The codec_complexitv_flag may be flag information indicating codec complexity. The video_average_bitrate information may indicate an average bitrate of video data and the video_maximum_bitrate information may indicate a maximum bitrate of video data. The horizontal_resolution information may indicate horizontal resolution, the vertical_resolution information may indicate vertical resolution, and the temporal resolution information may indicate time resolution. The video_minimum_buffer_size information may indicate a minimum buffer size for video data. The audio_average_bitrate information may indicate an average bitrate of audio data≟| average bitrate and the audio_maximum_bitrate information may indicate a maximum bitrate of audio data. The audio_minimum_buffer_size information may indicate a minimum buffer size for audio data. The download_capability may define capability required for downloading and may include required_storage information indicating a storage size required for downloading. The num_asset_descriptors information may indicate the number of asset descriptors. The asset_descriptors_byte information may include an asset level descriptor including asset related detailed information, etc. according to a value or the like of the mime_type( ).

FIG. 42 is a diagram showing a part of an MP table according to an embodiment of the present invention. Information on asset (which corresponds to a component) included in a service on MMT may be signaled using an MP table. The aforementioned MPT message may transmit the MP table. As described above, information items such as accessibility, 3D, and caption may be transmitted through an MMTP message. As shown in the drawing, the information items may be included in a portion of the MPT message and may be transmitted or may be transmitted as MMT signaling through a separately defined MMTP message. The information items and a transmission format will be described below in detail.

The information items may be transmitted in the form of a descriptor in an MPT message or other MMTP messages and, in some embodiments, the descriptors may correspond to an asset descriptor. The descriptors may be transmitted in DVB SI service signaling such as SDT or EIT or may be transmitted therewith.

In some embodiments, information on a service component (which corresponds to an asset) may be signaled on MMT, as shown in the drawing. Fields that will be described below may be further added to the MMTP message.

The service type field may indicate information on a type of a service including a corresponding service component or asset. The mime_type_len field may indicate a length of the mime_type. The mime_type ( ) field may indicate the mime_type of a corresponding asset. The mime_type ( ) of an asset included in a service on MMT may signal a code and detailed information of a corresponding codec, like RFC 6381. For example, the field may include general_profile_space, general_profile_idc, general_profile_compatibility_flags, general_tier_flag, general_level_idc, and the like and, furthermore, in the case of scalable (layered) HEVC and the like, sub layer related information and the like may be signaled.

The asset_role_flag field may indicate whether role information of a corresponding service component (asset) is included. The asset_target_flag field may indicate whether target screen information of a corresponding service component is included. The asset_group_flag field may indicate whether a corresponding service component belongs to a specific component group. When the corresponding service component belongs to the specific component group, a value of the present field may be 1. The rt_flag field may indicate whether a corresponding service component is transmitted in real time/non-real time. When a value of the present field is 1, the corresponding service component may be transmitted in real time.

The asset_role field may indicate a role of a corresponding service component. For example, when a value of the present field is 0, 1, 2, 3, 4, 5, 6, and 7, this may indicate the corresponding service component performs a role of primary video, an alternate camera view, other alternate video components, a sign language, follow subject video, a 3D left image, a 3D right image, 3D depth information, and the like.

The asset_target field may indicate a target device targeted by a corresponding service component. The field may be the same as the aforementioned definition of the @targetDevice. The asset_group_id field may provide an identifier of a component group including a corresponding service component. The component group has been as described above.

FIG. 43 is a diagram showing a plurality of descriptors according to an embodiment of the present invention. The illustrated descriptors may be transmitted as an asset descriptor or the like in a service signaling table such as an MP table and a DCI Table of the aforementioned MMT and may be transmitted as a part of service signaling of DVB SI (SDT or EIT) or the like. As shown in the drawing, the accessibility_descriptor may signal information on accessibility related to each component in the following form. The accessibility_descriptor may include the following fields. The descriptor_tag field may be an identifier of the accessibility_descriptor. The descriptor_length field may indicate a length of the corresponding accessibility_descriptor. The num_of_accessibility field may indicate the number of subsequent accessibility_code. The accessibility_codefield may include information on associated accessibility. The field may include the following values. 0x00: visually impaired, 0x01: hearing impaired, 0x02: 3D supported. 0x03-0xFF: reserved for future use The capability_descriptor may signal information on capability related to a component in the form shown in an intermediate part of the drawing. The capability_descriptor may include the following fields. The num_capability_codes field may indicate the number of capability codes included in a corresponding descriptor. The essential_indicator field may be a flag indicating whether a subsequent capability code needs to be supported to playback a service/component. When a value of the field is 1, this may indicate that a subsequent capability code is attributes required to playback a service/component. The capability_category field may indicate a target to which capability is applied or may indicate a category of capability. The capability_code field may indicate a capability code of a service/component.

The asset_group_descriptor may signal information on an asset group as a corresponding component group in the form shown in a lower part of the drawing when one or more components are grouped to configure one scene. The asset_group_descriptor may include the following fields. The asset_group_id field may be an identifier of an asset group. The num_of_accessibility field may indicate the number of assets included in a corresponding asset group. The asset_id ( ) field may indicate an identifier of each asset.

FIG. 44 is a diagram showing a method of signaling caption related information according to an embodiment of the present invention.

When an MMT asset is a closed caption stream component the information may include the closed caption descriptor shown as an asset_descriptor of an MP table, a DCI Table, or the like of the aforementioned MMT. Alternatively, when the asset_type has the following closed caption descriptor as an asset descriptor while having a value corresponding to an HEVC video stream, this may indicate that closed caption data is included in an HEVC video bitstream.

This may be included in another signaling table of the MMT. As shown in the drawing, information items related to a caption of a broadcast service may be signal through the aforementioned table. The closed caption descriptor may include the following fields. The descriptor_tag field may be an identifier indicating that a corresponding descriptor includes information on a closed caption stream. The descriptor_length field may indicate a length of a corresponding descriptor. The caption_lang field may include language information used in a closed caption component. The caption_codec field may indicate encoding format information and the like of a closed caption component. In some embodiments, the field may have the following values. 0x01: CEA-608, 0x02: CEA-708, 0x03: SMPTE timed text, 0x04: EBU-TT-D, 0x05: CFF-TT 0x06-0x1F: reserved for future use. The easy_reader field may be a flag indicating whether closed caption component data is an easy reader type. The wide_aspect_ratio field may be a flag indicating whether the closed caption component data supports a wide display aspect ratio and may have the following value, in some embodiments. 0x01-4:3, 0x02-16:9, 0x03-0x04: reserved for future use. The 3d_supported field may indicate whether a corresponding closed caption component may indicate whether 3D is supported. The url_flag field may indicate whether URL for acquiring caption information and data associated with a corresponding subsequent closed caption component is present and, when a value of the field is 1, the URL_length, the URL_text field, and the like may be present. The caption_service_number field may include a service number associated with a caption service when an encoding format of a closed caption component is the same as CEA-708. The URL_length field may indicate a length of a subsequent URL_text( ). The URL_text field may include a URL for acquiring caption information and data associated with a corresponding closed caption component. Therethrough, corresponding caption service data may be acquired through a broadband. In some embodiments, values/fields/information items of broadcast program related information may be omitted or may be configured in other forms.

FIG. 45 is a diagram showing a method of signaling caption related information according to another embodiment of the present invention. When an MMT asset is a closed caption stream component, the information may include a closed caption descriptor shown as an asset_descriptor of an MP table, a DCI Table, and the like of the aforementioned MMT. Alternatively, this may indicate that closed caption data is included in an HEVC video bitstream when the asset_type has the following closed caption descriptor as an asset descriptor while having a value corresponding to an HEVC video stream.

This may be included in another signaling table of MMT. As shown in the drawing, information items related to a caption of a broadcast service may be signaled through the aforementioned table. The closed caption descriptor may further include the following fields in the aforementioned fields included in FIG. 44. A repeated description will not be given here. The target_accessibility field may indicate a target user or the like of a closed caption, etc. and information thereof is now described. The information may have the following value. 0: normal, 1: easy reader. 2: visually impaired, and 3: hearing impaired. The aspect_ratio field may indicate an intended aspect ratio intended by a closed caption author. The field may have the following values, in some embodiments. 0x01-4:3, 0x02-16:9, 0x03: 21:9, 0x04-: reserved for future use. The alternative_aspect_ratio_flag field may indicate whether compatible aspect ratio information of a closed caption is included. The scrolling_supported field may be a flag indicating whether a scroll function in a region of a closed caption is supportable. The scaling_supported field may be a flag indicating whether an original closed caption region of a closed caption is extensible on a receiver during presentation as necessary. The playout_speed_flag field may be a flag indicating whether playout speed information of a closed caption is included. The extended_color_use field may indicate whether a color value configured with 8 bits or more of a closed caption is used. The min_disparity field may indicate a 3D location of the front-most closed caption/subtitle of a caption based on a screen when a closed caption supports 3D. When the information has a negative value, the information may indicate a degree of a forward protrusion effect based on a screen and, when the information has a positive value, this may be used in an opposite way. The information may explicitly indicate a front-most value (minimum disparity) of disparity of a plurality of closed caption regions in video. The scroll_direction field may indicate information of a direction in which a closed caption/subtitle region of the closed caption/subtitle is scrolled on a receiver. The field may indicate a value of "Top2Bottom", "Bottom2Top", "Left2Right", "Right2Left", and the like. The scroll type field may indicate a proceeding type of scrolling, etc. when the closed caption/subtitle region of the closed caption/subtitle supports scrolling on a receiver. For example, this may indicate whether scrolling is performed in units of lines (or cells) or is performed in units of pixels. The scroll_amount field may indicate a scrolling degree, etc. when the closed caption/subtitle information of the closed caption/subtitle supports scrolling on a receiver. This may be represented by a cell number, a pixel number, or the like. The scroll_speed field may indicate scrolling speed, etc. when a closed caption/subtitle region of a closed caption/subtitle supports scrolling on a receiver. This may be represented in units of seconds (if necessary, this may be represented down to decimal places). The scale_direction field may indicate information on a direction in which a closed caption/subtitle region of a closed caption/subtitle is extensible. This may have a value of "Top", "Bottom", "TomNBottom", "Left", "Right", "LeftNRight", "All", and the like. The Scale_limit_format field may indicate an extension limit degree or the like when the closed caption/subtitle region of the closed caption/subtitle is extensible. This may be represented by a cell number, a pixel number, or the like or may be represented by a percentage degree or the like. The Scale_limit_value field may indicate an extension limit degree or the like when the closed caption/subtitle region of the closed caption/subtitle is extensible. The Playout_speed field may indicate play-out speed of an original closed caption/subtitle region of the closed caption/subtitle during presentation on a receiver. This may be represented in units of seconds (if necessary, this may be represented down to decimal places).

FIGS. 46 to 48 are diagrams showing a method of signaling caption related information according to another embodiment of the present invention. When an MMT asset is a closed caption stream component, the information may include a closed caption descriptor shown as an asset_descriptor of an MP table, a DCI table, and the like of the aforementioned MMT. Alternatively, when the asset_type has the following closed caption descriptor as an asset descriptor while having a value corresponding to the HEVC video stream, this may indicate that closed caption data is included in a HEVC video bitstream.

This may be included in another signaling table of MMT. As shown in FIGS. 46 and 47, information items related to a caption of a broadcast service may be signaled through the aforementioned table. The closed caption descriptor may further include the following fields in the aforementioned fields of FIGS. 44 and 45. A repeated description will not be given here. The Profile field may indicate profile information in an encoding format of a caption/subtitle. For example, when the caption/subtitle is encoded based on an XML-based timed text, etc., this may indicate a format (e.g., TTML, IMSC, and EBU-TT-D) indicating a closed caption using a Timed text and the like. The Profile_version field may indicate version information of a format indicated by the aforementioned profile. That is, when the profile indicates TTML, the field may indicate TTML1 or TTML2 and when the profile uses IMSC, the field may indicate IMSC1, IMSC2, or the like. The sub-profile field may indicate a detailed profile in a form indicated by the aforementioned profile. For example, in the case of IMSC, the field may indicate an image-only profile, a text-only profile, or the like. Alternatively, the field may indicate whether a caption/subtitle includes only an image and includes only a text, and, furthermore, whether an image and a text are mixed. The wcg_use field may indicate whether a closed caption/subtitle uses wide color gamut. The color_gamut_included field may indicate whether color gamut related information used by a closed caption/subtitle is included. The hdr_use field may indicate whether a closed caption/subtitle includes HDR content.

The color_gamut_type field may indicate a type of color gamut, that is, chromaticity coordinates of color primaries used (to be used) during encoding/decoding. The color_primary_flag field may be a flag indicating whether detailed information on chromaticity coordinates of color primaries used or to be used during encoding/decoding is present. The color_primaryRxfield may indicate x coordinates of R-color of color primaries used or to be used during encoding/decoding. The color_primaryRyfield may indicate y coordinates of R-color of color primaries used or to be used during encoding/decoding. The color_primaryGxfield may indicate x coordinates of G-color of color primaries used or to be used during encoding/decoding. The color_primaryGyfield may indicate y coordinates of G-color used or to be used during encoding/decoding. The color_primaryBxfield may indicate x coordinates of B-color used or to be used during encoding/decoding. The color_primaryByfield may indicate y coordinates of B-color used or to be used during encoding/decoding. The color_whitePxfield may indicate x coordinates of a white point of color primaries used or to be used during encoding/decoding. The color_whitePyfield may indicate y coordinates of a white point of color primaries used or to be used during encoding/decoding. The hdr_param_set field may indicate an identifier indicating a combination of HDR related parameters of HDR content included in a caption/subtitle. According to an embodiment, the field may have a value shown in FIG. 48. The hdr_config_flag field may be a flag indicating whether detailed information of a HDR parameter of DHR content is included in a caption/subtitle. When a corresponding value is '1', a value of OETF_type, max_mastering_display_uminance, min_mastering_display_luminance, average_frame_luminance_level, and max_frame_pixel_luminance field may be present.

The OETF_typefield may indicate an identifier of an opto-electronic transfer function applied to HDR content in a caption/subtitle. A value of the field may have the following value. 0: reserved, 1: ITU-R BT.1886, 2: ITU-R REC.709, 3: ITU-R BT.2020, 4-255: reserved for future use. The max_mastering_display_luminancefield may indicate a value of peak luminance of mastering display. The field may have a value between 100 and 1000. The min_mastering_display_luminancefield may indicate a minimum luminance value (fractional value) of mastering display. The field may have a value between 0 and 1.0. The average_frame_luminance_levelfield may indicate a maximum value among average values of a luminance level of HDR content in a caption/subtitle. The max_frame_pixel_luminancefield may indicate a largest value of maximum values of pixel luminance of each of HDR contents in a caption:subtitle.

FIG. 49 is a diagram showing a method of transmitting a broadcast signal according to an embodiment of the present invention. The broadcast signal transmitting method may generate service data (DS49010). The service data may include caption data as well as video and audio data transmitted through a broadcast signal. The broadcast signal transmitting method may generate signaling information for signaling service data (DS49020). The signaling information according to the present invention may include the aforementioned service level signaling information and may include the aforementioned caption related information. The signaling information of the present caption related information has been as described with reference to FIGS. 15 to 48. The broadcast signal transmitting method may transmit a broadcast signal including service data and signaling information (DS49030). Here, the signaling information may include information on a caption. The information on the caption may be transmitted in the form of metadata transmitted with caption text data, as described above with reference to FIGS. 15 to 48. In this case, the information on the caption may be transmitted in service data. The information on the caption may be transmitted as a separate table or descriptor in DVB SI service signaling of SDT, EIT, or the like or may be transmitted together. The information on the caption may be transmitted in a box of the aforementioned ISOBMFF. In this case, the information on the caption may also be transmitted in service data together. The information on the caption may be transmitted as separating signaling information in a separate table or descriptor. For example, as described above, the information on the caption may be transmitted in MPD of MPEG-DASH or may be transmitted as asset_descriptor of an MP table, a DCI Table, etc. of MMT, as described above. The information on the caption may include scroll direction, scroll speed, scroll type, scaling, 3D disparity, color space, aspect ratio, and/or presentation anchor time related information, as described above.

Figure 50:
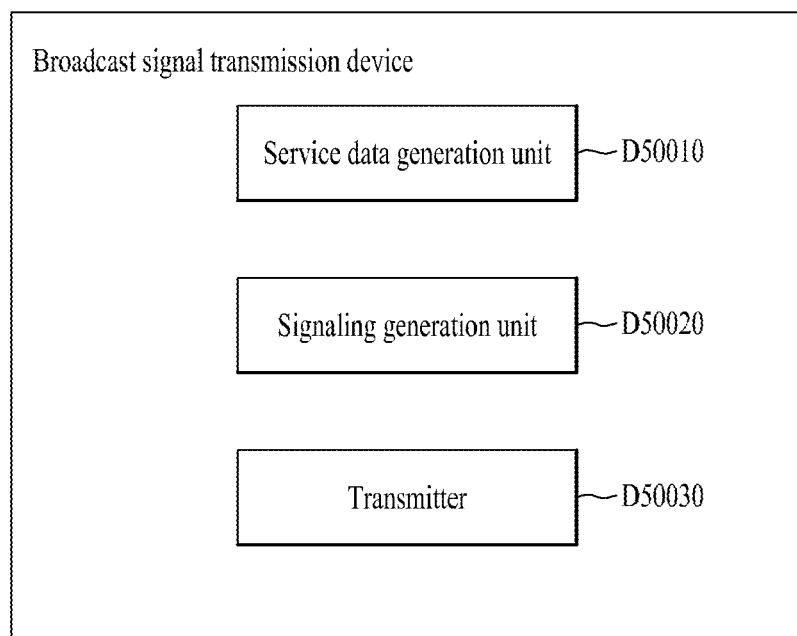
FIG. 50 is a diagram showing a broadcast signal transmission apparatus according to an embodiment of the present invention.

FIG. 50 is a diagram showing a broadcast signal transmission device according to an embodiment of the present invention. The broadcast signal transmission device may generate service data through a service data generation unit D50010. The service data may include caption data as well as video and audio data transmitted through a broadcast signal. The broadcast signal transmission apparatus may generate signaling information for signaling service data through a signaling generation unit D50020. The service data generation unit D50010 and the signaling generation unit D50020 may each be embodied and operated as a processor and, in some embodiments, may be integrated into one processor and operated. The signaling information according to the present invention may include the aforementioned service level signaling information and may include the aforementioned caption related information. The signaling information of the present caption related information has been as described with reference to FIGS. 15 to 48. The broadcast signal transmission method may transmit a broadcast signal including service data and signaling information using a transmitter D50030. Here, the signaling information may include information on a caption. The information on the caption may be transmitted in the form of metadata transmitted with caption text data, as described with reference to FIGS. 15 to 48. In this case, the information on the caption may be transmitted in service data together. The information on the caption may be transmitted in a box in the aforementioned ISOBMFF. In this case, the information on the caption may also be transmitted in service data together. The information on the caption may be transmitted as separation signaling information in a separate table or descriptor. For example, as described above, the information on the caption may be transmitted in MPD of MPEG-DASH or may be transmitted as asset_descriptor of MP table, DCI Table, or the like of MMT. The information on the caption may be transmitted as a separate table or descriptor in DVB SI service signaling SDT, EIT, or the like. The information on the caption may include scroll direction, scroll speed, scroll type, scaling, 3D disparity, color space, aspect ratio, and/or presentation anchor time related information, as described above.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording media storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The image processing method according to the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Various embodiments have been described in the best mode for carrying out the invention.

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

What is claimed is:

1. A method of transmitting at least one signal over a broadcast network, a broadband network or a hybrid network in a digital transmitter, the method comprising:
generating service layer signaling (SLS) information for at least one service, the at least one service consisting of at least one continuous video component, at least one continuous audio component and at least one closed caption component; and
generating a service list table (SLT) for providing bootstrap information that allows a receiver to discover the SLS information for the at least one service, wherein the bootstrap information includes a destination IP address and a destination port of a MPEG media transport protocol (MMTP) session carrying MMTP-specific SLS,
wherein a MMTP message is delivered by the MMTP session signaled in the SLT,
wherein the MMTP message includes a caption asset descriptor, and
wherein the caption asset descriptor includes profile information for representing image captions or text captions; and
transmitting the at least one signal.

2. The method of claim 1, wherein the profile information included in the caption asset descriptor is at least two bits.

3. A digital transmitter of transmitting at least one signal over a broadcast network, a broadband network or a hybrid network, the digital transmitter comprising:
a hardware-embedded signaling generation unit configured to generate service layer signaling (SLS) information for at least one service, the at least one service consisting of at least one continuous video component, at least one continuous audio component and at least one closed caption component, wherein the signaling generation unit is configured to generate a service list table (SLT) for providing bootstrap information that allows a receiver to discover the SLS information for the at least one service, further the bootstrap information includes a destination IP address and a destination port of a MPEG media transport protocol (MMTP) session carrying MMTP-specific SLS,
wherein a MMTP message is delivered by the MMTP session signaled in SLT,
wherein the MMTP message includes a caption asset descriptor, and
wherein the caption asset descriptor includes profile information for representing image captions or text captions; and
a hardware-embedded transmitter configured to transmit the at least one signal.

4. The digital transmitter of claim 3, wherein the profile information included in the caption asset descriptor is at least two bits.

5. A method of receiving at least one signal over a broadcast network, a broadband network or a hybrid network in a digital receiver, the method comprising:
receiving the at least one signal including a service list table (SLT) for providing bootstrap information; and
discovering service layer signaling (SLS) information for at least one service based on the bootstrap information, wherein the bootstrap information includes a destination IP address and a destination port of a MPEG media transport protocol (MMTP) session carrying MMTP-specific SLS, wherein a MMTP message is delivered by the MMTP session signaled in the SLT, wherein the MMTP message includes a caption asset descriptor, and wherein the caption asset descriptor includes profile information for representing image captions or text captions; and providing the at least one service, the at least one service consisting of at least one continuous video component, at least one continuous audio component and at least one closed caption component.

6. The method of claim 5, wherein the profile information included in the caption asset descriptor is at least two bits.

7. A digital receiver of receiving at least one signal over a broadcast network, a broadband network or a hybrid network, the digital receiver comprising:

a hardware-embedded receiving module configured to receive the at least one signal including a service list table (SLT) for providing bootstrap information; and a hardware-embedded parser configured to discover service layer signaling (SLS) information for at least one service based on the bootstrap information, wherein the bootstrap information includes a destination IP address and a destination port of a MPEG media transport protocol (MMTP) session carrying MMTP-specific SLS, wherein a MMTP message is delivered by the MMTP session signaled in the SLT, wherein the MMTP message includes a caption asset descriptor, and wherein the caption asset descriptor includes profile information for representing image captions or text captions; and a hardware-embedded output module configured to provide the at least one service, the at least one service consisting of at least one continuous video component, at least one continuous audio component and at least one closed caption component.

8. The digital receiver of claim 7, wherein the profile information included in the caption asset descriptor is at least two bits.

* * * * *